United States Patent
Ikeda et al.

(10) Patent No.: US 10,116,876 B2
(45) Date of Patent: Oct. 30, 2018

(54) IMAGE CAPTURING METHOD AND APPARATUS, WITH REDUCED SATURATION AND IMPROVED SIGNAL-TO-NOISE RATIO BASED ON A DYNAMIC RANGE

(71) Applicant: CANON KABUSHIKI KAISHA, Tokyo (JP)

(72) Inventors: Takeshi Ikeda, Tokyo (JP); Keisuke Matsuno, Fuchu (JP); Nobuto Matsuda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/183,434

(22) Filed: Jun. 15, 2016

(65) Prior Publication Data

US 2016/0373635 A1   Dec. 22, 2016

(30) Foreign Application Priority Data

Jun. 17, 2015   (JP) .................................. 2015-122112

(51) Int. Cl.
*H04N 5/235*   (2006.01)
*H04N 5/202*   (2006.01)
*H04N 5/228*   (2006.01)

(52) U.S. Cl.
CPC ........... *H04N 5/2353* (2013.01); *H04N 5/202* (2013.01); *H04N 5/2351* (2013.01); *H04N 5/2355* (2013.01); *H04N 5/2357* (2013.01)

(58) Field of Classification Search
CPC ................... H04N 5/202; H04N 5/243; H04N 5/2351–5/2353; H04N 5/2355–5/2357; H04N 5/23293

USPC ................................ 348/296, 342, 362–364
See application file for complete search history.

(56) References Cited

U.S. PATENT DOCUMENTS

| | | | | |
|---|---|---|---|---|
| 6,157,406 A | * | 12/2000 | Iura ....................... | H04N 5/2352 348/220.1 |
| 7,830,420 B2 | * | 11/2010 | Hyoudou ............... | H04N 5/235 348/222.1 |
| 8,279,304 B2 | * | 10/2012 | Tanaka ................... | H04N 5/235 348/221.1 |

(Continued)

FOREIGN PATENT DOCUMENTS

| | | |
|---|---|---|
| JP | 2004-120511 A | 4/2004 |
| JP | 2006-081037 A | 3/2006 |

*Primary Examiner* — Ngoc-Yen Vu
(74) *Attorney, Agent, or Firm* — Cowan, Liebowitz & Latman, P.C.

(57) ABSTRACT

An image capturing apparatus includes an image capturing unit for capturing an object image; an adjustment unit for adjusting the exposure of the image capturing unit; a detection unit for, in the case where the image capturing unit is saturated with respect to light that is input, detecting a signal level corresponding to the highest level of incident light in the image capturing unit after the adjustment unit reduces the exposure of the image capturing unit so as to reduce saturation; and a control unit for, in the case where the exposure of the image capturing unit is reduced by the adjustment unit, controlling the adjustment unit such that, among a plurality of methods for changing the exposure, a method having a faster response speed in response to an instruction to change the exposure is given priority and used.

11 Claims, 14 Drawing Sheets

(56) References Cited

U.S. PATENT DOCUMENTS

| | | | | |
|---|---|---|---|---|
| 8,934,050 B2* | 1/2015 | Imai | ............... | H04N 5/23216 |
| | | | | 348/333.02 |
| 9,019,407 B2* | 4/2015 | Ikeda | ............... | H04N 9/69 |
| | | | | 348/254 |
| 9,055,228 B2* | 6/2015 | Kinoshita | ............ | H04N 5/2353 |
| 2005/0264682 A1* | 12/2005 | Kurane | ............. | H04N 5/2352 |
| | | | | 348/362 |
| 2012/0314095 A1* | 12/2012 | Fukui | ................ | H04N 5/23219 |
| | | | | 348/220.1 |
| 2014/0168465 A1* | 6/2014 | Kobayashi | ............. | H04N 5/202 |
| | | | | 348/223.1 |

* cited by examiner

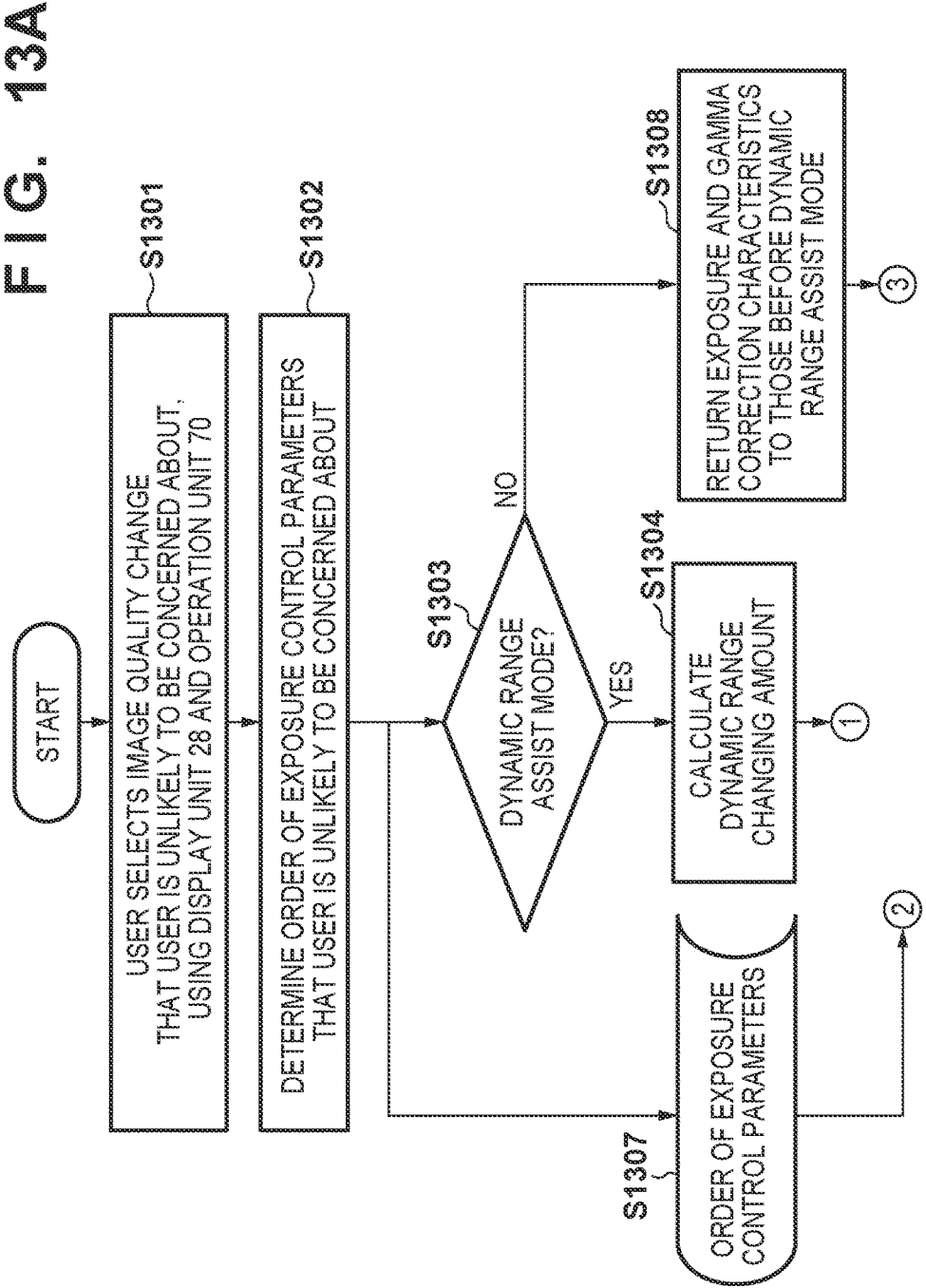

IMAGE CAPTURING METHOD AND APPARATUS, WITH REDUCED SATURATION AND IMPROVED SIGNAL-TO-NOISE RATIO BASED ON A DYNAMIC RANGE

BACKGROUND OF THE INVENTION

Field of the Invention

The present invention relates to an image capturing apparatus and a method for controlling the same, and, in particular, relates to an exposure control technique.

Description of the Related Art

There is known to be a method for suppressing blown-out highlights (overexposure) and blocked-up shadows (underexposure) in a captured image by shooting with an exposure that is lower than the standard exposure (under exposure) and adjusting the luminance by performing gamma correction (tone correction), and expanding the dynamic range compared to the dynamic range at the time of the standard exposure. Gamma correction characteristics (also referred to as a gamma curve) are characteristics that define the correspondence between an input level range based on a set dynamic range and a predetermined output level range, and it is possible to control how to reflect the tone property of the input level on the output level by changing the gamma correction characteristics (the shape of the gamma curve).

Some methods for expanding the dynamic range and changing gamma correction characteristics have been suggested. Japanese Patent Laid-Open No. 2004-120511 suggests a method for effectively using the tone of a high luminance portion as well by expanding the dynamic range and smoothing the inclination of the high luminance portion of the gamma correction characteristics. According to this method, even in a state where the dynamic range is narrow, the tone of the high luminance portion can be effectively used by changing the inclination of the high luminance portion of the tone characteristics.

In addition, Japanese Patent Laid-Open No. 2006-81037 suggests a method for making the incident light amount (maximum reflectance of an object) that is to correspond to the maximum output of an image sensor variable, and changing the gamma correction characteristics so as to maintain the output value that corresponds to a reference reflectance, even in the case where the maximum reflectance is changed. In this method, in the case of increasing the maximum reflectance, the gamma value is brought close to 0, and in the case of decreasing the maximum reflectance, the gamma value is brought close to 1. Accordingly, if the maximum reflectance is high, the contrast is reduced, and if the maximum reflectance is low, the contrast is increased.

In the case of expanding the dynamic range by combining shooting with an underexposure and changing the gamma correction characteristics, gamma correction compensates for the insufficiency in exposure, and thus the gamma correction involves signal amplification, causing a decrease in the S/N ratio. Therefore, from the viewpoint of the S/N ratio, it is preferred not to perform dynamic range expansion more than necessary. Therefore, in the case where blown-out highlights occur in an image under a certain shooting condition, it is thought that a user will desire the least amount of dynamic range expansion that can reduce the blown-out highlights. However, in the portion with blown-out highlights, the photometric values are also saturated, and it is not possible to specify the level of the incident light in the portion with blown-out highlights. Therefore, there is a problem in that the user cannot figure out a dynamic range expansion amount necessary to avoid the blown-out highlights.

In order to solve this problem, a method for temporarily expanding the dynamic range and identifying the highest level of incident light, and then setting a shooting condition for performing the least amount of dynamic range expansion that is necessary is conceivable. However, if the operation for specifying the highest level of incident light takes time, photo opportunities are missed, and usability deteriorates.

However, it is necessary to change the exposure to an underexposure in order to change the dynamic range, as described above, and a certain period of time is necessary for the change of the exposure. Usually, methods for changing the exposure include methods for changing the aperture value, inserting/removing an ND filter, changing the electronic shutter speed, changing the ISO sensitivity and the like. Among them, changing the electronic shutter speed and changing the ISO sensitivity correspond to changing the semiconductor device settings of circuits in the image sensor or the signal processing circuit, and thus take a short time. On the other hand, changing the aperture value and insertion/removal of the ND filter are operations performed via a mechanical mechanism, and thus a long period of time to some degree is required from the start of changing the exposure to the end.

For example, when operating the diaphragm using a stepping motor, consider the operation speed in the case where the aperture changes by $\frac{1}{8}$ per pulse and the motor rotation speed is 500 pps (pulses per second) is considered. In the case of changing the exposure by one stage, the stepping motor needs to be operated by 8 pulses. Therefore, the period of time when the diaphragm is operating is:

8 pulses÷500 pps=0.016 s=16 ms.

In actuality, in order to correctly operate the stepping motor, it is necessary to perform acceleration control for gradually increasing the speed, instead of driving at 500 pps from initial movement. Moreover, the time required for the acceleration is approximately several tens of ms. Also, when stopping the stepping motor, in order to stop at a precise position, it is necessary to perform deceleration control of approximately several tens of ms similarly to the acceleration control.

Regarding insertion/removal of the ND filter as well, an operation via a mechanical mechanism using a stepping motor or the like is common. In particular, with an ND filter incorporated in a video camera for business use, performance that is demanded is high, and thus it is necessary to cover the entire opening diameter. Furthermore, a plurality of ND filters are required so as to be able to be applied to various scenes. Therefore, in the case of operating the ND filter, the ND filter will be operated over a distance longer than the distance over which the opening diameter of the diaphragm is operated, and the operation time becomes longer. Therefore, in the case of expanding the dynamic range, a time lag occurs due to the time required for changing the exposure, causing photo opportunities to be missed. Moreover, there is a problem in that a setting error is caused, or the user is caused to have an unnatural feeling during the use.

SUMMARY OF THE INVENTION

The present invention has been made in light of the above-described issue, and provides an image capturing apparatus that makes it possible for an operation of detecting the highest level of incident light by expanding the dynamic range to be realized in a short period of time.

According to a first aspect of the present invention, there is provided an image capturing apparatus comprising: an image capturing unit configured to capture an object image and output image data; an adjustment unit configured to adjust an exposure of the image capturing unit; a detection unit configured to, in a case where the image capturing unit is saturated with respect to light that is input, detect a signal level corresponding to a highest level of incident light in the image capturing unit after the exposure of the image capturing unit is reduced by the adjustment unit so as to reduce the saturation; and a control unit configured to, in a case where the exposure of the image capturing unit is reduced by the adjustment unit, control the adjustment unit such that among a plurality of methods for changing the exposure, a method having a faster response speed with respect to an exposure change instruction is given priority and used.

According to a second aspect of the present invention, there is provided an image capturing apparatus, comprising: an image capturing unit configured to capture an object image and output image data; an adjustment unit configured to adjust an exposure of the image capturing unit; a detection unit configured to, in a case where the image capturing unit is saturated with respect to light that is input, detect a signal level corresponding to a highest level of incident light in the image capturing unit after the exposure of the image capturing unit is reduced by the adjustment unit so as to reduce the saturation; and a selection unit configured to, in a case where the exposure of the image capturing unit is reduced by the adjustment unit, select a method that is to be given priority and used, among a plurality of methods for changing the exposure, in accordance with an instruction from a user.

According to a third aspect of the present invention, there is provided a method for controlling an image capturing apparatus including an image capturing unit for capturing an object image and outputting image data, the method comprising: adjusting an exposure of the image capturing unit; detecting, in a case where the image capturing unit is saturated with respect to light that is input, a signal level corresponding to a highest level of incident light in the image capturing unit after reducing the exposure of the image capturing unit by the adjusting so as to reduce the saturation; and controlling, in a case where the exposure of the image capturing unit is reduced by the adjusting, the adjusting such that among a plurality of methods for changing the exposure, a method having a faster response speed with respect to an instruction to change the exposure is given priority and used.

According to a fourth aspect of the present invention, there is provided a method for controlling an image capturing apparatus that includes an image capturing unit for capturing an object image and outputting image data, the method comprising: adjusting an exposure of the image capturing unit; detecting, in a case where the image capturing unit is saturated with respect to light that is input, a signal level corresponding to a highest level of incident light in the image capturing unit after reducing the exposure of the image capturing unit by the adjusting so as to reduce the saturation; and selecting, in a case where the exposure of the image capturing unit is reduced by the adjusting, a method that is to be given priority and used, among a plurality of methods for changing the exposure, in accordance with an instruction from a user.

Further features of the present invention will become apparent from the following description of exemplary embodiments with reference to the attached drawings.

BRIEF DESCRIPTION OF THE DRAWINGS

FIGS. 13A and 13B are flowcharts showing operations of exposure and gamma correction characteristics determination processing in a sixth embodiment.

DESCRIPTION OF THE EMBODIMENTS

Figure 1:
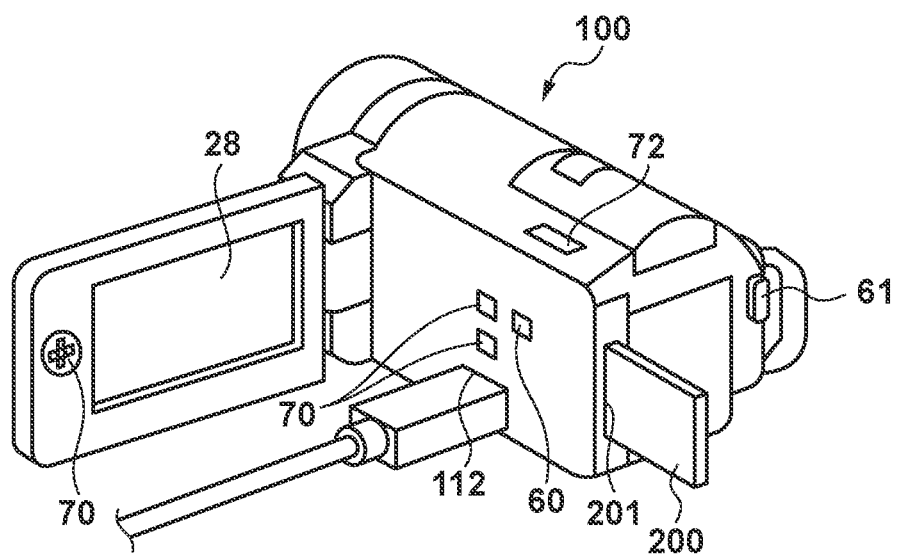
FIG. 1 is a diagram of the appearance of a digital video camera in first and second embodiments.

Embodiments of the present invention will be described below in detail with reference to accompanying drawings.

First, an overview of the embodiments of the present invention will be described. As a method for, in the case of capturing a moving image with a video camera, suppressing blown-out highlights (overexposure) that are a phenomenon in which a region in an image (screen) that corresponds to a high luminance object is unnaturally bright due to the high luminance object being overexposed, there is a method of using underexposure and raising the sensitivity to expand the dynamic range. However, in the case where blown-out highlights occur with the current exposure, a user cannot figure out what degree of dynamic range expansion is required to be able to avoid the blown-out highlights, in other words, what degree of underexposure the exposure is required to be changed to so as to be able to suppress the blown-out highlights. This is because the signals in the portion with blown-out highlights are saturated in the image data, and is due to the camera not being able to detect the highest value of the signal level of that portion.

In view of this, in these embodiments, a wide range of values are temporarily set for the dynamic range during shooting. Accordingly, the saturation is eliminated in the portion that had blown-out highlights, and it becomes possible to detect the highest value of the signals in the portion (the signal level corresponding to the highest level of incident light in the portion in which saturation occurred). In other words, it is possible to obtain the difference between the highest value of a signal that can be expressed within the dynamic range that has been set so far and the highest value of the signals in the portion that had blown-out highlights. It can then be seen that the blown-out highlights can be avoided if the dynamic range is expanded by this difference, which can be notified to the user. However, if the exposure is changed to the underexposure side in an attempt to expand the dynamic range during shooting as described above, the change in exposure is reflected in the image, and the user will see an unnatural image in which the brightness changes. Therefore, in these embodiments, the operation of expanding the dynamic range during shooting is accompanied by a change in the gamma characteristics of the image. Subsequently, even after expanding the dynamic range, a video image (display image) that was generated by changing the gamma characteristics has blown-out highlights that appear to be substantially the same as before expanding the dynamic range is displayed. Accordingly, it is possible to find out the highest value of the signals in the portion with blown-out highlights, and it is possible to avoid the case where the displayed video image changes unnaturally.

In addition, in the case of expanding the dynamic range, the exposure will be changed as described above, and if the time required for this change of exposure is long, the operability of the camera is adversely affected. Therefore, in this embodiment, a method for shortening the time required for this change of exposure as much as possible will also be described. Note that the above-described exposure is a control value related to the brightness of an output value from the image capturing unit including the image sensor when an object is captured, and can be indicated in APEX units, for example.

First Embodiment

FIG. 1 is a diagram showing the appearance of a digital video camera 100, which is a first embodiment of an image capturing apparatus of the present invention. In FIG. 1, a display unit 28 is a display unit for displaying images and various types of information. A video recording switch 61 is an operation unit for giving a shooting instruction. A mode changing switch 60 is an operation unit for switching various modes. A connector 112 is a connector for connecting a connection cable to the digital video camera 100. An operation unit 70 is an operation unit provided with operation members such as various buttons and a cross key for accepting various operations from a user. A power supply switch 72 switches between on and off of a power supply. A recording medium 200 is a recording medium such as a memory card or a hard disk. A recording medium slot 201 is a slot for storing the recording medium 200. The recording medium 200 can communicate with the digital video camera 100 by being stored in the recording medium slot 201.

Figure 2:
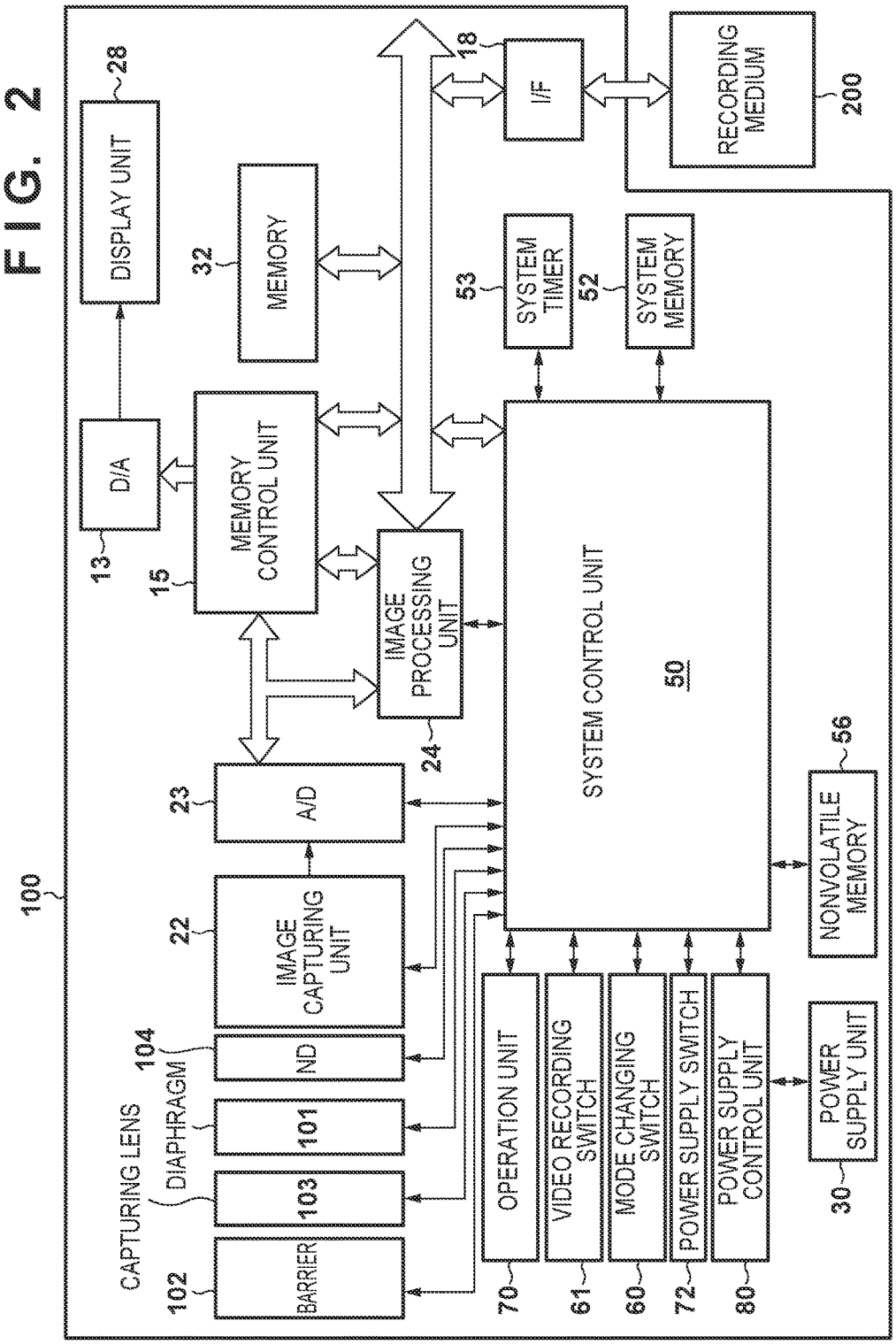
FIG. 2 is a block diagram showing a configuration of the digital video camera in the first and second embodiments.

FIG. 2 is a block diagram showing the internal configuration of the digital video camera 100 of the first embodiment. In FIG. 2, a capturing lens 103 is a lens group including a zoom lens and a focus lens, and forms object images. A diaphragm 101 is a diaphragm used for light amount adjustment. An ND filter (Neutral Density Filter) 104 is a filter used for light reduction. An image capturing unit 22 has an image sensor that is constituted by a CCD, a CMOS sensor or the like for converting optical images into electric signals. The image capturing unit 22 also has functions such as storage control using an electronic shutter, changing an analog gain, changing a reading speed and the like. An A/D converter 23 converts analog signals into digital signals. The A/D converter 23 is used for converting analog signals output from the image capturing unit 22 into digital signals. The barrier 102 prevents soiling and damage of an image capturing system including the capturing lens 103, the diaphragm 101 and the image capturing unit 22 by covering the image capturing system including the capturing lens 103, within the digital video camera 100.

An image processing unit 24 performs, on data from the A/D converter 23 or data from a memory control unit 15, processing including resize processing such as predetermined pixel interpolation processing and reduction processing, color conversion processing, gamma correction processing, digital gain addition processing and the like. Predetermined calculation processing is also performed using captured image data, and the calculation result is transmitted to a system control unit 50. Based on the transmitted calculation result, the system control unit 50 performs exposure control, distance measurement control, white balance control and the like. Accordingly, TTL (through the lens) AF (autofocus) processing, AE (automatic exposure) processing, AWB (automatic white balancing) processing and the like are performed.

Output data from the A/D converter 23 is written to the memory 32 via the image processing unit 24 and the memory control unit 15 or directly via the memory control unit 15. The memory 32 stores image data captured by the image capturing unit 22 and converted into digital data by the A/D converter 23, as well as image data to be displayed on the display unit 28. The memory 32 is provided with a storage capacity sufficient for storing moving images and sound for a predetermined period of time.

The memory 32 also serves as a memory for image display (video memory). A D/A converter 13 converts image display data stored in the memory 32 into analog signals, and supplies the analog signals to the display unit 28. Thus, the image display data written to the memory 32 is displayed by the display unit 28 via the D/A converter 13. The display unit 28 performs, on a display device such as an LCD, display that is based on the analog signals from the D/A converter 13. Digital signals that were A/D converted by the A/D converter 23 and stored in the memory 32 are analog-converted by the D/A converter 13, and are successively transferred to the display unit 28 and displayed, thereby realizing an electronic view finder, making it possible to display a through-the-lens image.

A nonvolatile memory 56 is an electrically erasable and recordable memory, and an EEPROM is used, for example. The nonvolatile memory 56 stores constants, programs and the like for operation of the system control unit 50. The programs here are programs for executing various flowcharts, which will be described later.

The system control unit 50 controls the entire digital video camera 100. By executing the programs recorded in the above-described nonvolatile memory 56, various types of processing of this embodiment, which will be described later, are executed. A RAM is used for a system memory 52. Constants and variables for operation of the system control unit 50, programs read out from the nonvolatile memory 56 and the like are loaded in the system memory 52. The system control unit 50 also performs display control by controlling the memory 32, the D/A converter 13, the display unit 28 and the like.

A system timer 53 is a clocking unit that clocks times used for various types of control and the time of an incorporated clock. The mode changing switch 60, the video recording switch 61 and the operation unit 70 are operation units for inputting various operation instructions to the system control unit 50.

The mode changing switch 60 switches the operation mode of the system control unit 50 to one of a moving image recording mode, a still image recording mode, a reproduction mode and the like. As modes included in the moving image recording mode and the still image recording mode, there are an auto shooting mode, an automatic scene determination mode, a manual mode, various scene modes in which shooting settings are made for each shooting scene, a program AE mode, a custom mode and the like. By operating the mode changing switch 60, it is possible to switch directly to one of these modes included in the moving image recording mode. Alternatively, the mode changing switch 60 may be used to switch the moving image recording mode, and thereafter another operation member may be used to switch to one of the modes included in the moving image recording mode. The video recording switch 61 switches between a shooting stand-by state and a shooting state. When the video recording switch 61 is turned on, the system control unit 50 starts a series of operations from reading out signals from the image capturing unit 22 to writing moving image data to the recording medium 200.

By selecting and operating various function icons displayed on the display unit 28, for example, functions appropriate to the situation are assigned to the operation members of the operation unit 70, and the operation members then operate as various function buttons. The function buttons include an END button, a BACK button, an image scrolling button, a JUMP button, a narrow-down button, an attribute changing button and the like. For example, when a menu button is pressed, a menu screen that enables various settings to be changed is displayed on the display unit 28. An operator can intuitively perform various settings using the menu screen displayed on the display unit 28, a four directional (up, down, right and left) cross key and a SET button.

A power supply control unit 80 is constituted by a battery detection circuit, a DC-DC converter, a switch circuit for switching blocks to be energized, and the like, and detects whether a battery is mounted, the type of battery, and the battery remaining capacity. The power supply control unit 80 also controls the DC-DC converter based on the detection result and an instruction from the system control unit 50, and supplies a necessary voltage to the units including the recording medium 200 for a necessary period of time.

A power supply unit 30 is constituted by a primary battery such as an alkaline battery or a lithium battery, a secondary battery such as a NiCd battery, a NiMH battery or a Li ion battery, an AC adaptor, or the like. A recording medium I/F 18 is an interface with the recording medium 200 such as a memory card or a hard disk. The recording medium 200 is a recording medium such as a memory card for recording shot images, and is constituted by a semiconductor memory, a magnetic disk or the like.

Next, the operations of the digital video camera of this embodiment will be described. In this embodiment, in the case where a portion of a video image that is currently being shot has blown-out highlights (is overexposed), the digital video camera 100 can display the difference between the highest value of the signal values in this portion with blown-out highlights and the highest value of a signal that can be expressed within the dynamic range that is currently set. The user can see that the blown-out highlights in the image can be avoided if the dynamic range is expanded (the degree of underexposure is increased) by this displayed difference. This function will be referred to as D range assist.

In this embodiment, in order to detect the highest value of the signal values of the portion with blown-out highlights, the dynamic range (hereinafter referred to as the D range) is temporarily expanded to the maximum value that can be set with the digital video camera 100. Accordingly, saturation of the signals in the portion with blown-out highlights is eliminated, and the highest value of the signal values of the portion with blown-out highlights can be detected. At this time, underexposure is used in order to expand the D range, but if this change in exposure appears in a displayed image, the user will see an unnatural image in which the brightness changes. In order to avoid this, gamma correction characteristics are adjusted so as to display an image that seems as if the exposure has not been changed, and which is overexposed in the same manner as before expanding the dynamic range. That is, the exposure and gamma correction characteristics are adjusted such that a saturated portion does not appear to change in the display image before and after expanding the dynamic range. Note that various types of processing in this embodiment are realized by the system control unit 50 loading programs stored in the nonvolatile memory 56 to the system memory 52 and executing the programs.

Figure 3:
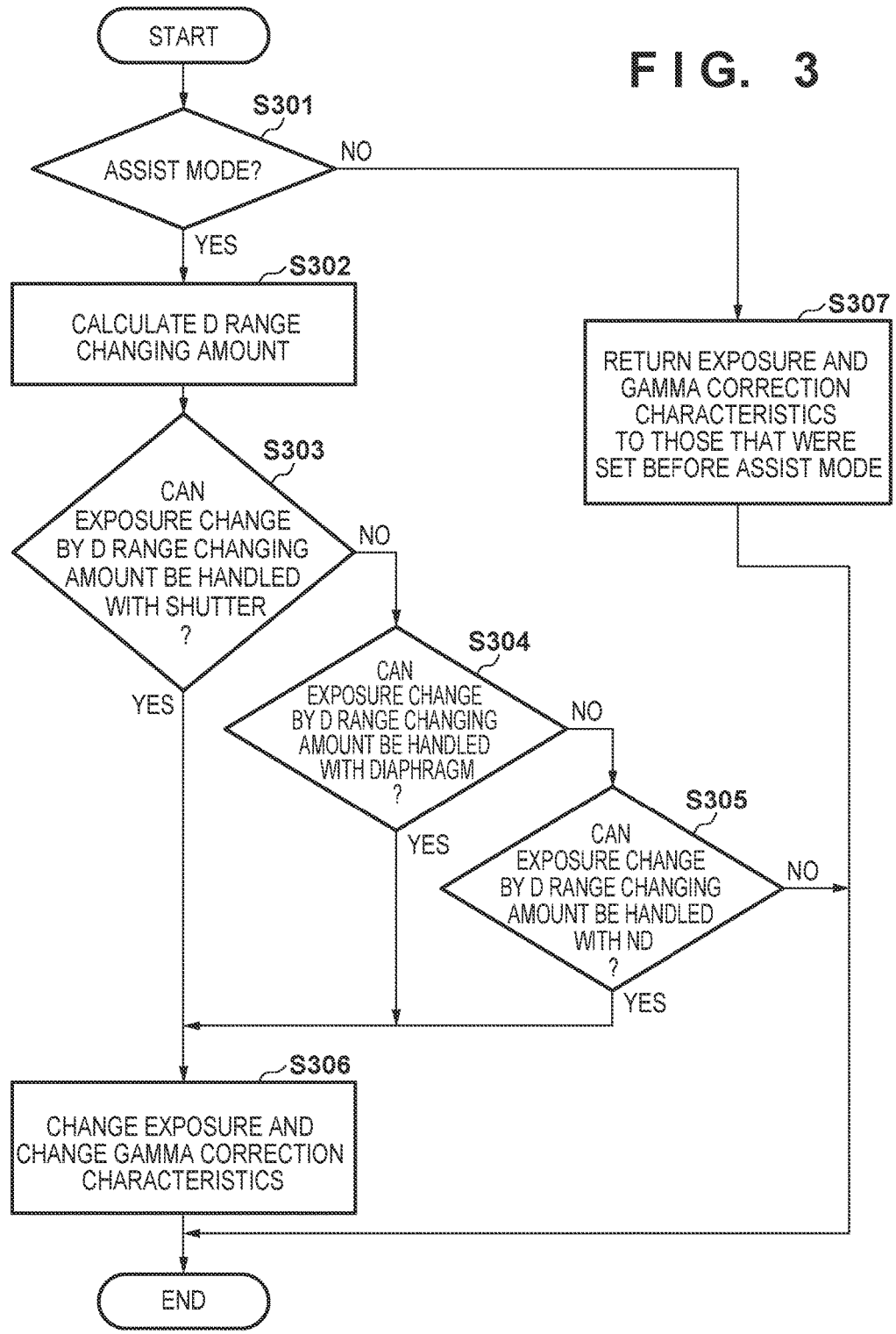
FIG. 3 is a flowchart showing determination processing for determining exposure and gamma correction characteristics in the first embodiment.

Processing for changing exposure and gamma correction characteristics in accordance with a D range to be set (in this embodiment, Dmax) will be described below. FIG. 3 is a flowchart showing the operations of exposure and gamma correction characteristics determination processing in this embodiment.

First, in step S301, it is determined whether or not D range assist is enabled. Enabling and disabling of D range assist is set by the user using the operation unit 70. If D range assist is disabled, the states of the exposure and gamma correction characteristics are returned in step S307 to the states before enabling D range assist. If D range assist is enabled, the amount by which the D range is to be changed (hereinafter, referred to as a D range changing amount) is calculated in step S302. In this embodiment, assume that the D range is changed to Dmax, which is the maximum D range that can be set with the digital video camera 100. Letting the current D range be Dnow, and the D range after being changed be Dmax, Dchange, which is the number of stages of the D range changing amount is expressed by Expression 1.

$$D\text{change} = \log_2(D\text{max}/D\text{now}) \qquad \text{Exp. 1}$$

For example, if the maximum D range that can be set is 800%, and the current D range is 400%, the D range changing amount is one stage. If the current D range is 300%, the D range changing amount is approximately 1.52 stages.

Next, in step S306, how to change the exposure is selected in steps S303 to S305, when changing the exposure and gamma correction characteristics in accordance with the D range changing amount calculated in step S302. In the selection in steps S304 and S305, out of the aperture value of the diaphragm 101, insertion/removal of the ND filter 104, and the electronic shutter in the image capturing unit 22, the exposure parameter with the fastest response speed is given priority, and is used for changing the exposure. The order of response speed is stored in the system control unit 50 in advance. The response times of the diaphragm and the ND filter 104, which involve a mechanical mechanism, are several tens of ms, and several frames will be required for changing the exposure. In addition, the distance over which the ND filter 104 is driven is larger than the distance over which the diaphragm 101 is driven, and thus the response speed of the diaphragm 101 is faster than that of the ND filter 104. The time required for changing the electronic shutter speed depends on the semiconductor response speed, and thus the electronic shutter speed is immediately changed when an instruction to change the electronic shutter speed is given to the image capturing unit 22. Specifically, based on the above-described response speeds, the priority order that is stored in the system control unit 50 is:

(1) changing the electronic shutter speed regarding the image capturing unit 22,
(2) changing the aperture value regarding the diaphragm 101, and
(3) inserting/removing the ND filter 104.

Here, the reason why changing the analog gain that can be set with the image capturing unit 22 is not included in the options is as follows. This embodiment is described on the premise that image capturing is performed with as narrow a dynamic range as possible in order to improve the image quality. Therefore, if the analog gain of the image capturing unit 22 is decreased when expanding the D range, the number of saturation electrons of the pixels of the image capturing unit 22 runs short, and it becomes impossible to expand the D range.

The cases of changing the exposure using exposure parameters other than the analog gain will be described below. In FIG. 3, first, in step S303, it is determined whether or not changing the exposure can be handled with the electronic shutter. In the case of changing the electronic shutter speed, if the electronic shutter speed before changing the D range is 1/60 seconds, and the D range changing amount is one stage, the electronic shutter speed is changed to 1/120 seconds. If the setting upper limit value of the electronic shutter speed is 1/2000 seconds, and was already set to 1/2000 seconds, which is the setting upper limit value before changing the D range, it is impossible to change the exposure using the electronic shutter when changing the D range (303: No). Therefore, it is determined in step S304 whether or not changing the exposure can be handled by changing the aperture value of the diaphragm 101 that has a priority lower by one stage than the method that uses the electronic shutter. Here, if the aperture value was also set to the setting upper limit value of the product already before changing the D range (step S304: No), it is determined in step S305 whether or not changing the exposure can be handled by changing the inserted/removed state of the ND filter that has a priority lower than changing the aperture value by one stage. Subsequently, in step S306, the exposure is changed to the exposure that is based on the D range changing amount calculated in step S302, by a method of one out of changing the electronic shutter speed, changing the aperture value, and inserting/removing the ND filter, or a method of the combination thereof, based on the determinations in steps S303 to S305. Note that here, as an example, the range in which the electronic shutter speed, the aperture value or the ND filter can be changed is assumed to be the setting upper limit value of the product. However, a configuration may be adopted in which they can be set over the range when changing the D range. This is because the purpose for expanding the D range is to obtain the correct luminance value of the portion in which saturation occurred.

In addition, in step S306, when the D range is changed, the gamma correction characteristics to be set for a gamma correction circuit inside the image processing unit 24 are also changed at the same time. Letting Y be the output (output signals of the image sensor) for the input (light intensity) X after expanding the D range and before changing the gamma correction characteristics, the gamma correction characteristics are changed such that the output of X×Dnow/Dmax is Y. In addition, letting the highest value of the input before changing the gamma correction characteristics be Xmax, and the maximum value of the output be Ymax, the gamma correction characteristics are changed such that the output is Ymax when the input is Xmax×Dnow/Dmax after changing the gamma correction characteristics, and the output for the input after that is Ymax.

Figure 4:
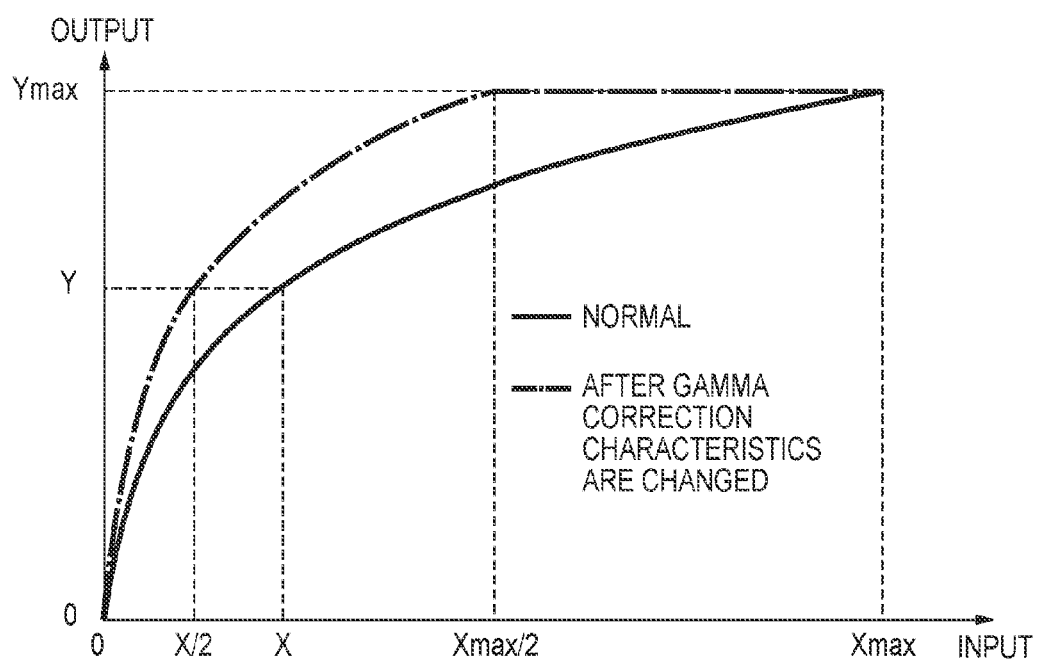
FIG. 4 is a diagram showing an example of gamma correction characteristics before and after D range assist in the first embodiment.

FIG. 4 is a diagram showing an example of the relationship between input and output of gamma correction characteristics before and after expanding the D range. FIG. 4 is an example of the case in which Dnow is 400% and Dmax is 800%. The horizontal axis indicates input bits (light intensity) of the gamma correction circuit, and the vertical axis indicates output bits. Before expanding the D range, a signal of 400% is the maximum value of the D range, that is, Xmax. Also, after expanding the D range, a signal of 800% is the maximum value of the D range, that is, Xmax, and the signal of 400% is Xmax/2.

If the D range is expanded without changing the normal gamma correction characteristics, underexposure occurs, the image becomes dark, and blown-out highlights are eliminated. That is, the video image being displayed changes. In order to prevent the user from seeing this change, the gamma correction characteristics are changed. Specifically, Dnow/Dmax is 1/2 (=400%/800%), and thus the gamma correction characteristics are changed such that the output for the input X before changing the gamma correction characteristics is the same as the output for the input X/2 after changing the gamma correction characteristics as indicated by a dashed-dotted line in FIG. 4. In addition, after being changed, the gamma correction characteristics are Ymax at the time of Xmax/2, and are maintained at Ymax after that. This set value based on the gamma correction characteristics is transmitted to the image processing unit 24, and is set in the gamma correction circuit.

Figure 5:
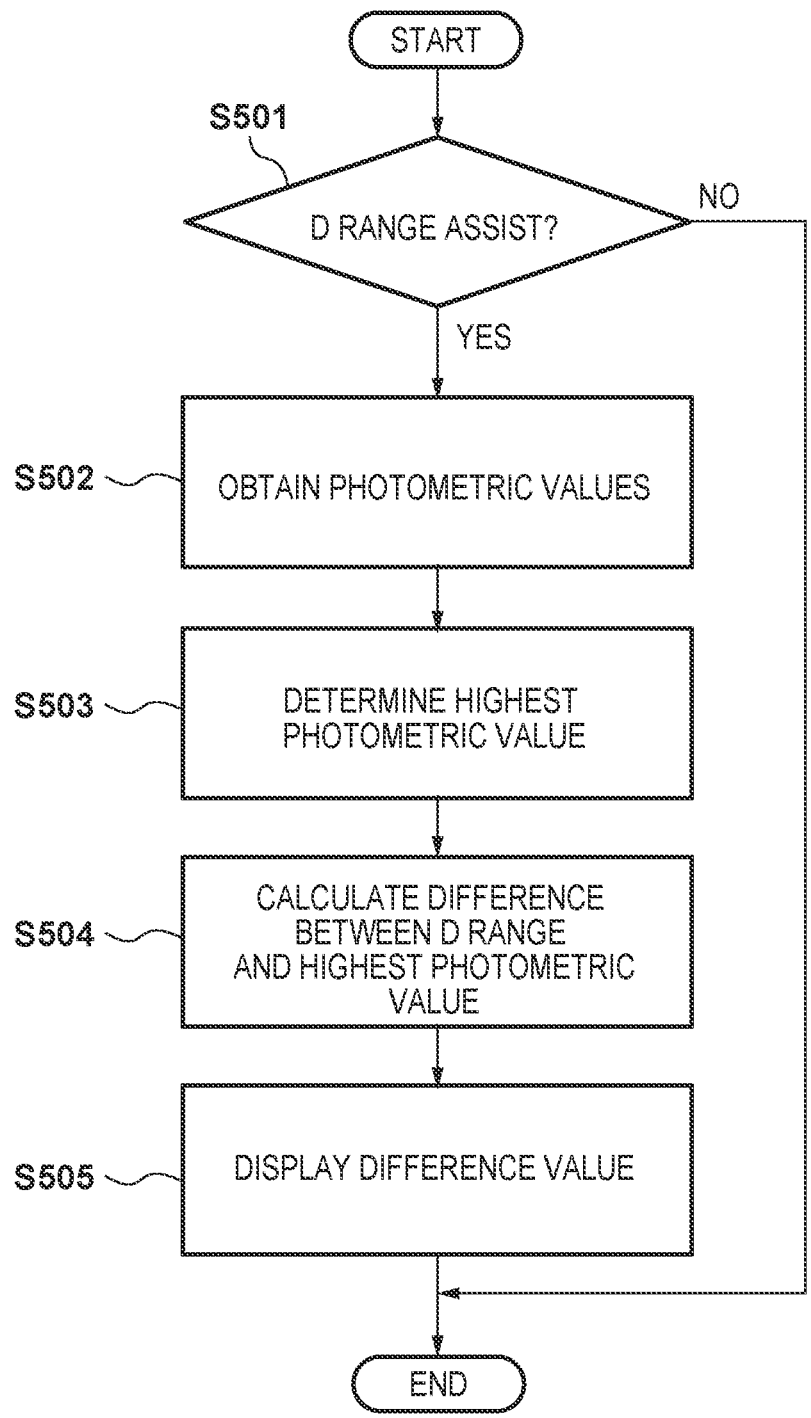
FIG. 5 is a flowchart showing display processing for displaying a difference value in the first embodiment.

By expanding the D range as described above, it is possible to find out the signal values of the portion with blown-out highlights in a state where the D range is widened before being input into the gamma correction circuit. Processing for calculating the difference between the highest value of signals obtained after expanding the D range and the maximum value of a signal that can be expressed within the D range before being expanded will be described below. FIG. 5 is a flowchart showing the operations of calculating and further displaying this difference value.

First, it is determined in step S501 whether or not D range assist is enabled. If D range assist is disabled, this flow is ended without performing the following processing. If D range assist is enabled, in step S502, a photometric value (the highest photometric value) of the portion with blown-out highlights that became detectable by expanding the D range and photometric values of the other portions are obtained. In the image processing unit 24, this photometric value is calculated from image data after expanding the D range and before passing through the gamma correction circuit.

Figure 6A:
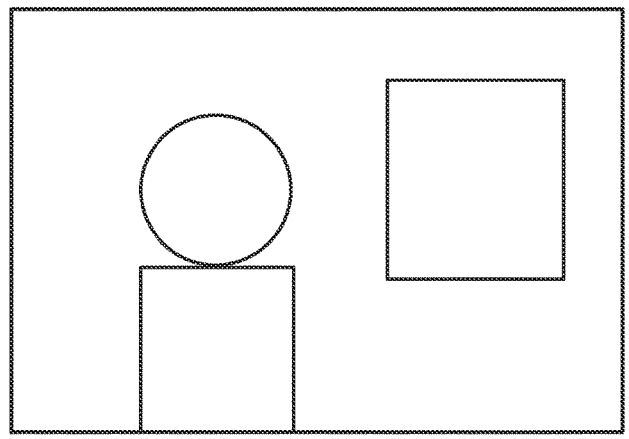
FIGS. 6A to 6C are diagrams showing an example of a photometric frame for an image and display thereof in the first to sixth embodiments.
Figure 6B:
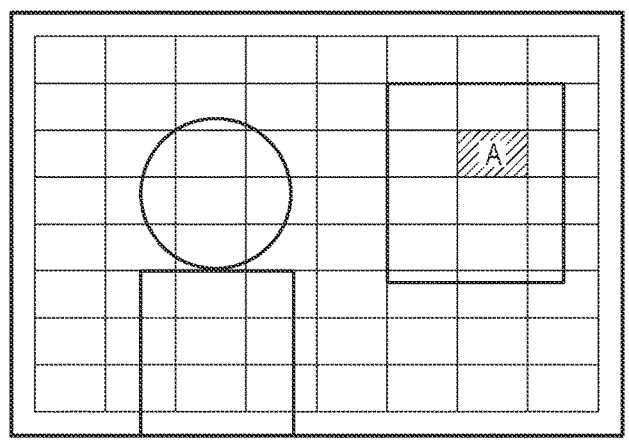
Figure 6C:
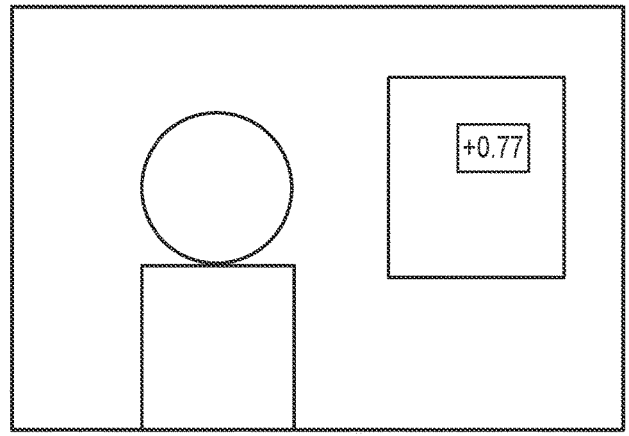

A photometric value is a value obtained by separating (dividing) image data (within the screen) into a plurality of frames of a specific size and calculating the average value of the luminance signals of image data in a separated frame. In this embodiment, assume that the image data is separated into 8×8 frames (regions). FIGS. 6A to 6C are diagrams showing an example of arrangement of photometric frames and display thereof with respect to an image. FIG. 6A shows the image in which photometry is performed, and FIG. 6B shows the image and the photometric frames. The system control unit 50 averages the luminance values for each of 64 photometric frames, and obtains 64 luminance average values. In this embodiment, the photometric value is assumed to be the average value of the luminance signals, but it is sufficient that the brightness of each of the frames is known, and the brightness may be expressed by an integrated value, or may be expressed by a value that serves as in indicator of brightness such as an EV value.

Next, in step S503, the highest photometric value is determined. The highest value among the above 64 photometric values is extracted, and is stored along with the position of the frame. Next, in step S504, the difference between the maximum value of a signal that can be expressed within the current D range and the highest photometric value is calculated. The difference value is calculated by Expression 2 below.

$$\text{difference value}=\log_2(\text{highest photometric value}/(\text{maximum value}\times\text{current } D \text{ range}/\text{maximum } D \text{ range})) \quad \text{Exp. 2}$$

For example, if the current D range is 400%, the maximum D range is 800%, the maximum value is 4095, and the highest photometric value is 3500, the difference value is approximately 0.77 stages. In other words, if the D range is changed by 0.77 stages so as to be the D range of approximately 680%, the highest photometric value falls within the range of maximum values that can be expressed within the D range. In addition, there is a possibility that exposure correction corresponding to 0.77 stages becomes necessary at the same time, and that the S/N ratio decreases by the amount.

Lastly, in step S505, the difference value is displayed. The system control unit 50 transmits the position of the photometric frame that shows the highest photometric value and the difference value to the image processing unit 24. In the image processing unit 24, the image of the frame is rendered in accordance with the position of the frame, an image showing the difference value in that frame is generated, and an image obtained by superimposing that image on the image data is generated. The image data passes through the memory control unit 15 and the D/A converter 13 and is displayed on the display unit 28. FIG. 6C shows a display example of the difference value. It is an example of the case in which the photometric value of a frame A shown in FIG. 6B is the highest photometric value. Due to this display of the difference value, it can be seen that change of the D range by 0.77 stages is required in order to bring the object of the frame A within the D range. Note that in this embodiment, the example in which the difference value is displayed in the frame was described, but the method for displaying the frame and the location in which the numerical value is displayed are arbitrary, and are not particularly limited to the example in FIG. 6C.

By detecting the photometric value using the method as described above, as long as the photometric value is within the range of the maximum D range that can be set with the digital video camera 100, even if the photometric value is a photometric value that is out of the current D range, it is possible to find out the relationship between the maximum value of the current D range and the highest photometric value. Therefore, the photometric value can be used as a guide when the user changes the D range.

In addition, in the case of expanding the dynamic range, if the time required for changing the exposure is long, the operability of the camera is adversely affected. In this embodiment, the one with the fastest response speed out of changing the aperture value, inserting/removing the ND filter, and changing the electronic shutter speed in the image capturing unit is given priority, and is used for changing the exposure. Accordingly, it becomes possible to shorten the time required for changing the exposure as much as possible.

Second Embodiment

In the first embodiment, an example is described in which, in the case where D range assist is enabled, gamma correction characteristics are changed in the state where the D range is maximized, such that the relationship between incident light and the output for the incident light is substantially the same as before expanding the D range, and images appear as if the images have not been changed in the displayed video. However, expanding the D range is substantially the same as increasing the gain, and thus the S/N ratio deteriorates in accordance with the amount of expansion. In other words, a sense of noise differs before and after executing D range assist. Therefore, in this embodiment, an example will be described in which in the case of executing D range assist, the amount of expansion of the D range is lessened as much as possible, rather than setting the D range to the maximum value that can be set.

Figure 7:
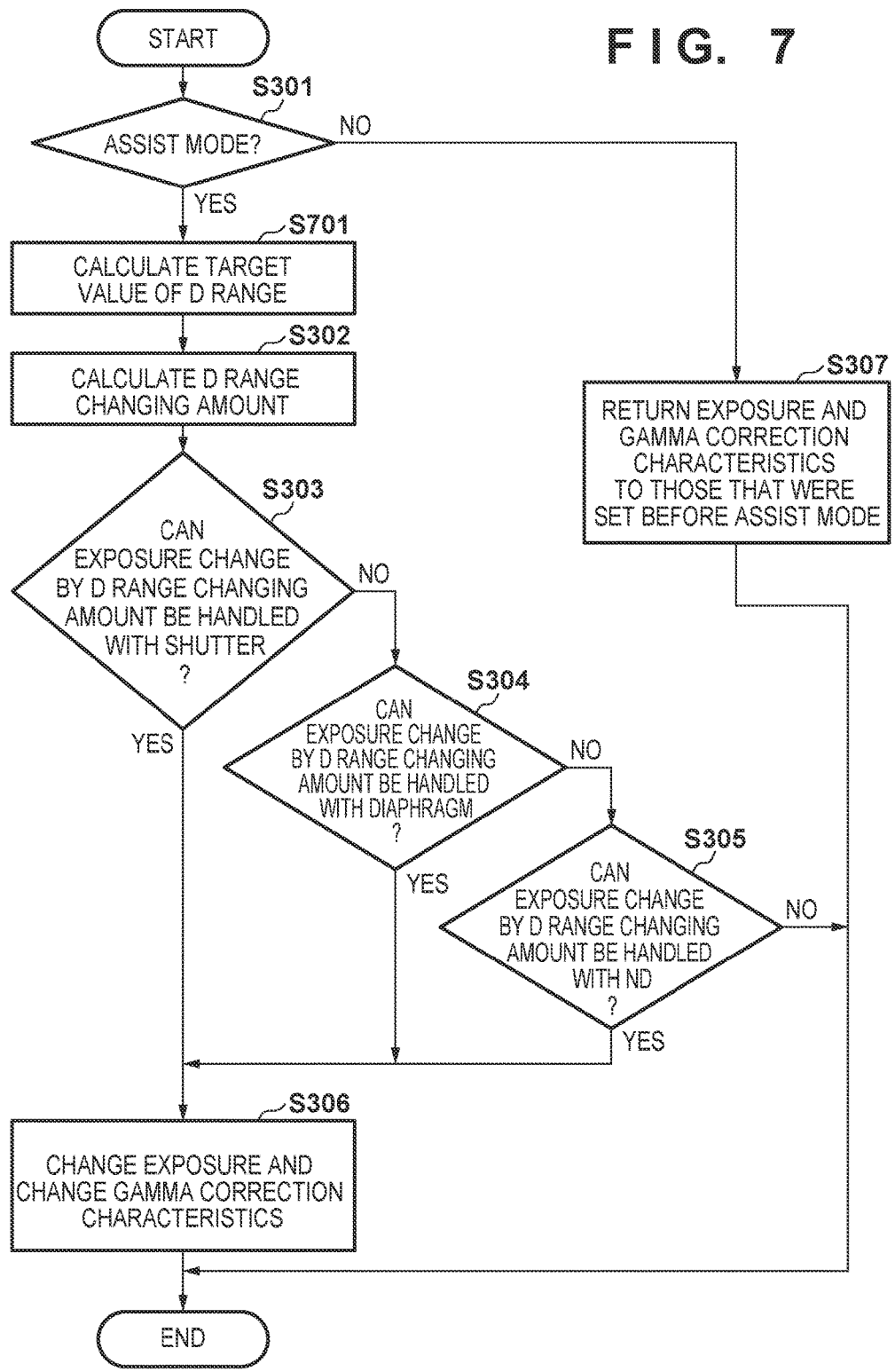
FIG. 7 is a flowchart showing determination processing for determining exposure and gamma correction characteristics in the second embodiment.

The appearance and configuration of the image capturing apparatus is the same as the configuration in FIGS. 1 and 2 described in the first embodiment, and thus the description thereof is omitted. FIG. 7 is a flowchart showing the operations of exposure and gamma correction characteristics determination processing in this embodiment.

First, similarly to the first embodiment, in step S301, it is determined whether or not D range assist is enabled. If D range assist is disabled, the states of the exposure and gamma correction characteristics are returned to the states before D range assist was enabled, in step S307. If D range assist is enabled, photometric values are detected, and the target value of the D range is calculated based on the photometric values, in step S701. Note that here, it is assumed that photometric values of 8×8=64 frames are obtained similar to the first embodiment. The photometric values may be partially saturated. In addition, calculation of the target value of the D range will be described later.

Next, in step S302, the number of stages of the D range changing amount (Dchange) is calculated from the current D range (Dnow) and the calculated target value of the D range (Dtarget), using Expression 3 below.

$$D\text{change}=\log_2(D\text{target}/D\text{now}) \quad \text{Exp. 3}$$

Next, similarly to the first embodiment, when changing the exposure and gamma correction characteristics in step S306 in accordance with the D range changing amount calculated in step S302, how to change the exposure is selected in steps S303 to S305. Next, in step S306, the exposure is changed in accordance with the D range changing amount calculated in step S302.

On the other hand, when the exposure is changed in order to change (specifically, expand) the D range, underexposure occurs and the image changes. In order to prevent the user from seeing this, the gamma correction characteristics are changed. The gamma correction characteristics are changed to gamma correction characteristics according to which the relationship between the input X and output corresponding thereto before changing the gamma correction characteristics is the same as the relationship between the input X×Dnow/Dtarget and output corresponding thereto after changing the gamma correction characteristics. In addition, the gamma correction characteristics after being changed become Ymax at the time of Xmax×Dnow/Dtarget, and Ymax is maintained after that.

Figure 8:
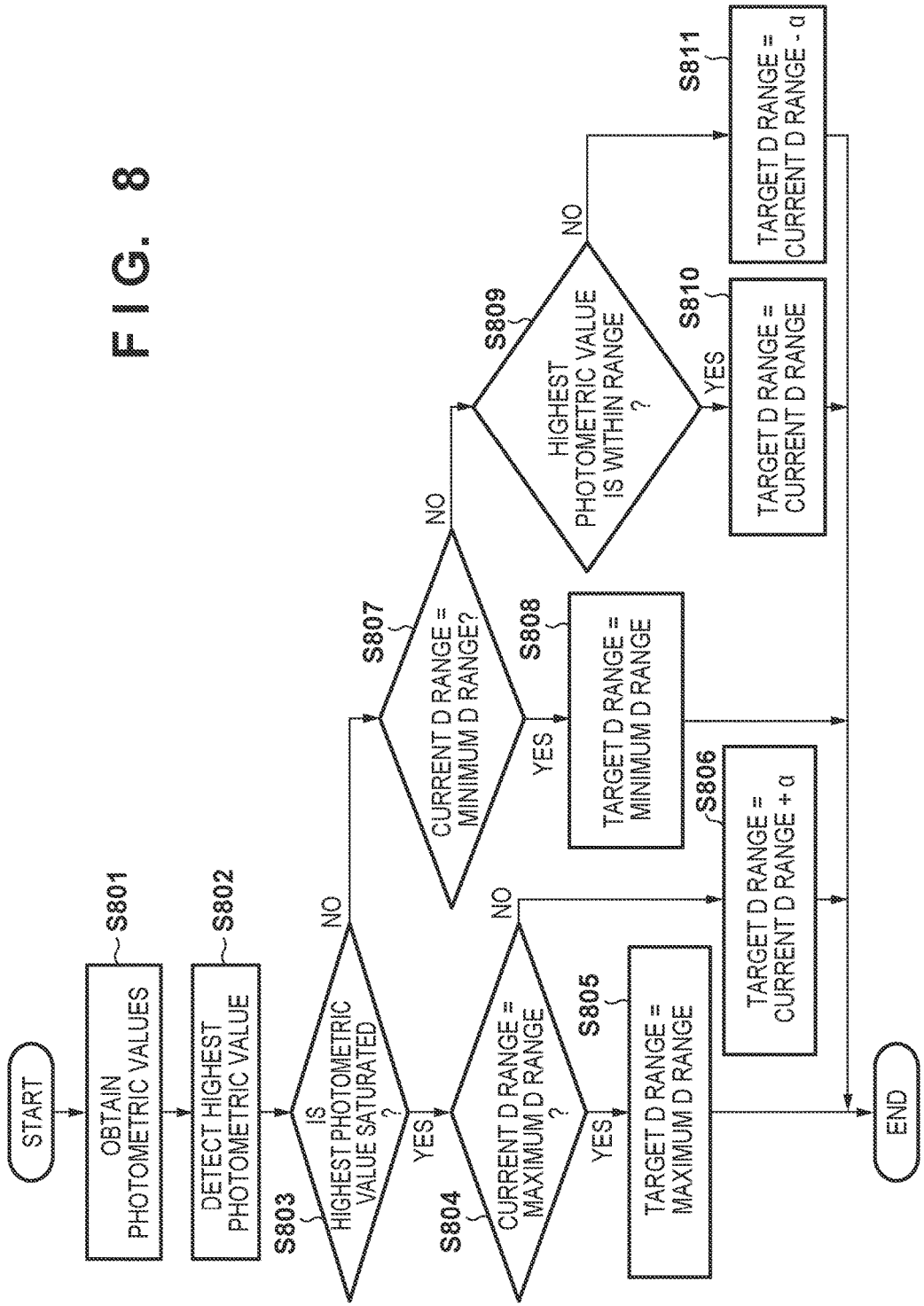
FIG. 8 is a flowchart showing determination processing for determining a target dynamic range in the second embodiment.

Next, a method for calculating the target value of the D range in step S701 will be described. FIG. 8 is a flowchart showing an operation of calculating the target value of the D range.

First, in step S801, photometric values are obtained. Similarly to the first embodiment, photometric values for 8×8=64 frames are obtained. Next, in step S802, the highest value among the photometric values for the 64 frames is detected.

Next, in step S803, it is determined whether or not the highest photometric value is saturated. If the photometric value is 12 bits, it is determined whether or not the photometric value is 4095, that is the maximum value that can be expressed with 12 bits. Saturation determination may be performed based on a flexible range. For example, it may be determined that the highest photometric value is saturated if it is greater than or equal to 4000.

If it is determined in the determination in step S803 that the highest photometric value is saturated, it is determined in step S804 whether or not the current D range is the maximum D range (Dmax). If the current D range is the maximum D range, it is not possible to expand the D range any further even if the photometric value is saturated, and thus in step S805 the target D range is set to be the maximum D range. In other words, the current D range is maintained. If it is determined in the determination in step S804 that the current D range is not the maximum D range, the D range can be expanded, and thus the D range is increased by a fixed value (constant value) α. For example, letting α be current D range'1/20, and the current D range be 700%, the target D range is assumed to be 735%.

If it is determined in the determination in step S803 that the highest photometric value is not saturated, it is determined in step S807 whether or not the current D range is the minimum D range. This is because it is conceivable that the current D range is excessively broad if the highest photometric value is not saturated, and thus reduction of the D range is also considered. If it is determined in the determination in step S807 that the current D range is the minimum D range, the D range cannot be reduced any further, and thus the target D range is assumed to be the minimum D range in step S808. In other words, current D range is maintained.

If it is determined in the determination in step S807 that the target D range is not the minimum D range, it is determined in step S809 whether or not the highest photometric value is within a predetermined range. This predetermined range is a range close to the maximum value of the D range. If the highest photometric value is in a state close to saturation (close to the maximum value of the D range), the D range is a sufficiently small range that can cover the maximum photometric value, and the D range does not need to be changed. Therefore, if the photometric value is within the predetermined range that is close to the maximum value of the D range, the target D range is assumed to be the current D range in step S810. For example, assuming that the photometric value is 12 bits, if the highest photometric value is greater than or equal to 4095×9/10, the current D range is assumed to be maintained. This is a case in which if the current D range is 700%, the highest photometric value is equivalent to 630% to 700%.

If it is determined in the determination in step S809 that the highest photometric value is not within the predetermined range, the highest photometric value is lower than the maximum value of the D range, and thus in step S811, the D range is reduced by the fixed value α. Assuming that α is the current D range×1/20, if the current D range is 700%, the D range after being reduced is 665%. Note that the fixed value α is not limited to this value, and may be changed in accordance with the D range, or different values may be used in step S806 and step S811. Furthermore, in step S811, the target D range may be calculated from the highest photometric value. In that case, a D range that causes the highest photometric value to be 4095×19/20 may be used. In that case, the target D range (Dtarget) can be calculated using the current D range (Dnow) and the highest photometric value (Emax) by Expression 4.

$$Dtarget=(Dnow \times Emax)/(4095 \times 19/20) \quad \text{Exp. 4}$$

In steps S806 and S811, it is sufficient that target the D range can be increased or decreased.

Figure 9:
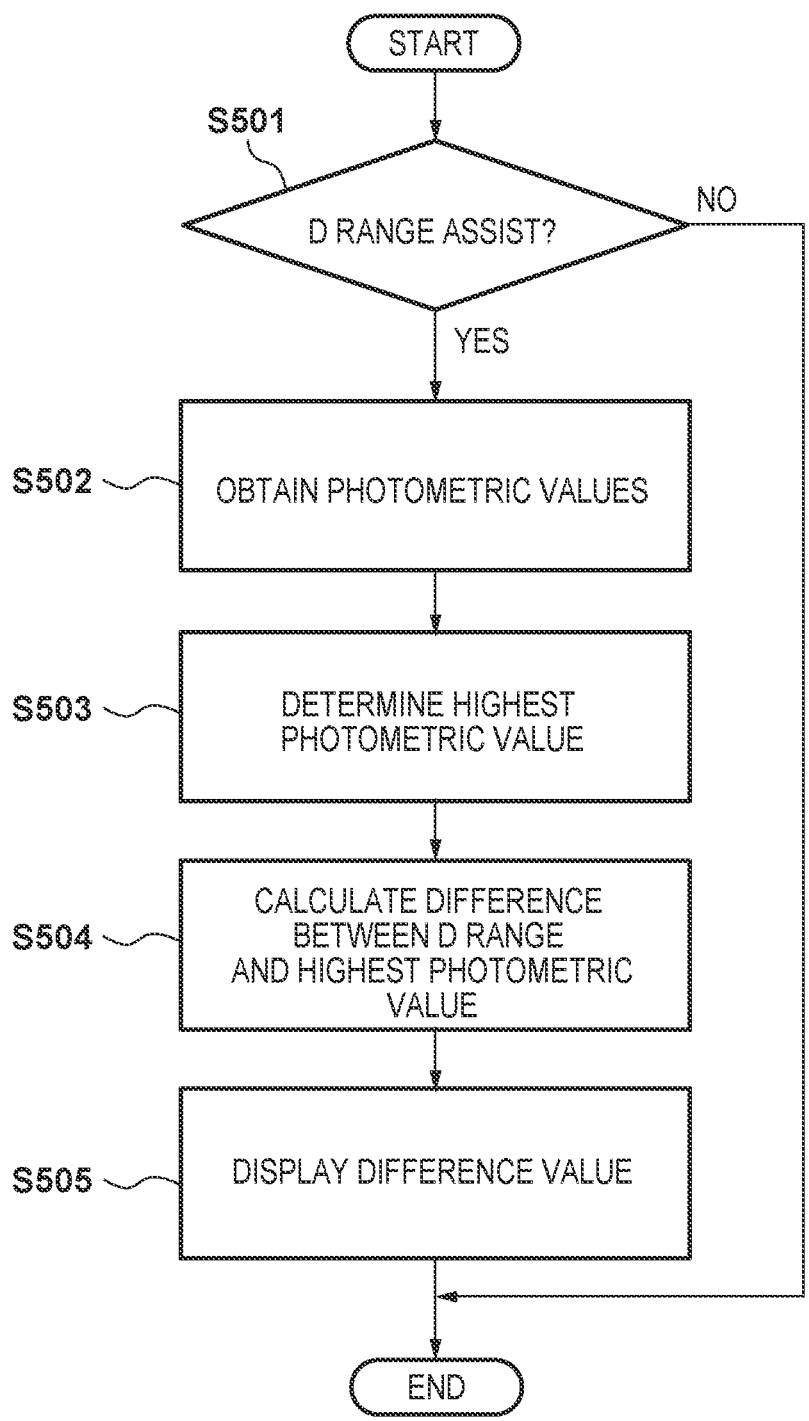
FIG. 9 is a flowchart showing display processing for displaying a difference value in the second embodiment.

Next, a method for displaying the difference value between the highest photometric value and the maximum value of the current D range (displaying a value indicating the degree of expansion of the D range necessary to be able to avoid blown-out highlights (overexposure)) in this embodiment will be described. FIG. 9 is a flowchart showing processing for displaying the difference value between the highest photometric value and the maximum value of the D range.

First, similarly to the first embodiment, in step S501, it is determined whether or not D range assist is enabled. If D range assist is disabled, this flow is ended without performing the following processing. If D range assist is enabled, similarly to the first embodiment, the D range is expanded in accordance with the operations in FIG. 8. Subsequently, in step S502, photometric values are obtained from the image data after expanding the D range and before passing through the gamma correction circuit, and in step S503, the highest photometric value is extracted. Next, in step S901, the difference between the changing target value that served as the target value when expanding the D range and this highest photometric value is calculated. The difference value is calculated by Expression 5 below.

$$\text{difference value}=\log_2(\text{highest photometric value}/(\text{maximum value} \times \text{current } D\text{range/target } D\text{range})) \quad \text{Exp. 5}$$

Lastly, in step S505, the difference value is displayed similarly to the first embodiment.

In the case of executing D range assist, if the above method is used for changing the D range, the D range can be changed to a D range that is close to the highest photometric value of the video image, and thus the change in S/N ratio before and after executing D range assist can be reduced as much as possible.

As described above, according to the above-described second embodiment, the D range is expanded by a minimum required amount, and at the same time, the output characteristics for incident light become substantially the same as before expanding the D range, whereby it is possible to obtain photometric values that were saturated before expanding the D range, without causing a displayed video image to be unnatural. Therefore, using the photometric values and the current D range, the difference between the maximum value of D range and the photometric values can be calculated.

In addition, in the case of expanding the dynamic range, if the time required for changing the exposure is long, the operability of the camera is adversely affected. In this embodiment, the one with the fastest response speed out of changing the aperture value, inserting/removing the ND filter, and changing the electronic shutter speed in the image capturing unit is given priority and is used for changing the exposure. Accordingly, it becomes possible to shorten the time required for changing the exposure as much as possible.

Third Embodiment

In the first and second embodiments, the case was described in which changing (increasing) the electronic shutter speed is given priority when changing the exposure, in order to quickly expand the D range. However, if the electronic shutter speed is increased, so-called flickering, which is light amount change at a predetermined cycle, may occur depending on the light source (illumination light). In this third embodiment, a method for suppressing the occurrence of flickering in the case of expanding the D range by changing the electronic shutter speed will be described.

Figure 10:
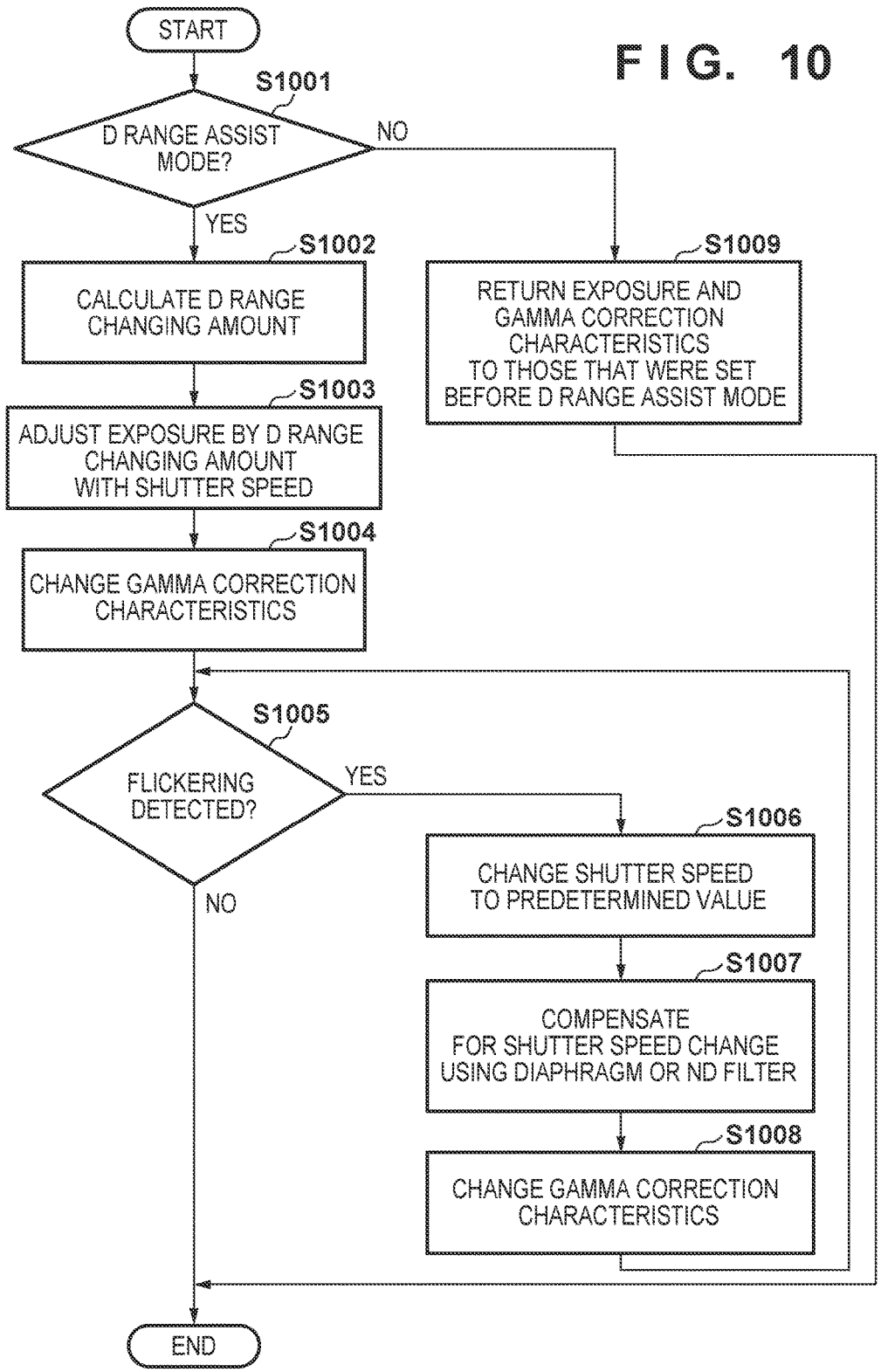
FIG. 10 is a flowchart showing determination processing for determining exposure and gamma correction characteristics in a third embodiment.

The appearance and configuration of the image capturing apparatus are the same as the configuration in FIGS. 1 and 2 described in the first embodiment, and thus the description thereof is omitted. FIG. 10 is a flowchart showing the operations of exposure and gamma correction characteristics determination processing in this embodiment.

First, it is determined in step S1001 whether or not D range assist is enabled. Enabling and disabling of D range assist is set by the user using the operation unit 70. If D range assist is disabled, the states of the exposure and gamma correction characteristics are returned in step S1009 to the states before enabling D range assist, and the processing is ended. If D range assist is enabled, the amount by which the D range is to be changed (hereinafter, referred to as the D range changing amount) is calculated in step S1002. In this embodiment, assume that the D range is changed to Dmax, which is the maximum D range that can be set with the digital video camera 100. Letting the current D range be Dnow, and the D range after being changed be Dmax, Dchange, which is the number of stages of the D range changing amount, is expressed by Expression 6.

$$D\text{change} = \log_2(D\text{max}/D\text{now}) \quad \text{Exp. 6}$$

For example, if the maximum D range that can be set is 800%, and the current D range is 400%, the D range changing amount is one stage. If the current D range is 300%, the D range changing amount is approximately 1.52 stages.

Next, in step S1003, the exposure is changed in accordance with the D range changing amount calculated in step S1002, by changing the electronic shutter speed. For example, if the electronic shutter speed before changing the D range is 1/60 second, and the D range changing amount is one stage, the electronic shutter speed is changed to 1/120 second.

Furthermore, in step S1004, when the D range is changed, the gamma correction characteristics to be set for a gamma correction circuit inside the image processing unit 24 are also changed at the same time. Letting Y be the output (output signals of the image sensor) for the input (light intensity) X after expanding the D range and before changing the gamma correction characteristics, the gamma correction characteristics are changed such that the output of X×Dnow/Dmax is Y. In addition, letting the highest value of the input before changing the gamma correction characteristics be Xmax, and the maximum value of the output be Ymax, the gamma correction characteristics are changed such that the output is Ymax when the input is Xmax× Dnow/Dmax after changing the gamma correction characteristics, and the output for the input after that is Ymax. The relationship between the input and the output before and after expanding the D range in this case and the relationship between the input and the output before and after changing the gamma correction characteristics are the same as in FIG. 4 described in the first embodiment, and thus the description thereof is omitted. Due to this change of the gamma correction characteristics, it is possible to prevent the influence of the change of the exposure from appearing in a displayed image.

Next, in step S1005, flicker detection is performed by the image processing unit 24 and the system control unit 50 analyzing the luminance difference or the like between the frames of the image data. In the case where flickering is not detected here, the processing is ended without any change.

On the other hand, in the case where flickering is detected in step S1005, the electronic shutter speed is changed to a predetermined value in order to reduce the flickering in step S1006. Here, the predetermined value is an electronic shutter speed at which it is predicted that the occurrence of flickering can be suppressed. In the case where the cycle of the flickering has been detected from the analysis by the image processing unit 24 and the system control unit 50, the electronic shutter speed is changed so as to obtain an exposure time equivalent to the detected cycle or an exposure time of an integer multiple of the detected cycle. For example, in the case where flickering is occurring at a cycle of 1/100 seconds, the occurrence of flickering can be suppressed by setting the electronic shutter speed to 1/100 seconds or 1/50 seconds.

In the case where the cycle of flickering cannot be detected, there is a high possibility that flickering is occurring due to a light source that is operated with a power supply of 60 Hz or 50 Hz, which is the frequency of a general power supply for business use. Therefore, the electronic shutter speed is changed to 1/120 seconds or 1/100 seconds, or 1/60 seconds or 1/50 seconds that respectively represents an exposure time of an integer multiple of 1/120 seconds or 1/100 seconds. At this time, with a light source that is operated with a power supply having the same frequency as the framerate of the image capturing apparatus, flickering does not occur. Therefore, for example, in the case where the image capturing apparatus captures images at a framerate of 50 frames per second, it is not necessary to set the electronic shutter speed to 1/100 seconds or 1/50 seconds, and it is sufficient that the electronic shutter speed is set to an exposure time of 1/120 seconds or an integer multiple thereof. Note that if the frequency deviates even slightly such as in the case where the framerate of the image capturing apparatus is 59.94 frames per second and the power supply frequency is 60 Hz, flickering may occur, and thus attention is required.

In addition, it is conceivable that the electronic shutter speed before D range assist is executed has been adjusted by the user to a value at which flickering does not occur, and thus in step S1006, the electronic shutter speed may be returned to the electronic shutter speed before D range assist was executed. Furthermore, in the case where there is an electronic shutter speed at which occurrence of flickering could be suppressed when D range assist was executed in the past, that value may be used.

Subsequently, in order to change the electronic shutter speed and at the same time, compensate for the changed amount of the exposure in step S1007, exposure correction is performed using the diaphragm 101 or the ND filter 104 (a method other than the method of changing the electronic shutter speed). Furthermore, in step S1008, the gamma correction characteristics are changed. The processing for changing the gamma correction characteristics is processing similar to the process of step S1004.

After that, in step S1005, flicker detection is performed again, and in the case where flickering is detected, the processes of step S1006 to step S1008 are repeated. These processes may be performed until flickering is not detected any longer, or a restriction on the number of times may be provided.

Fourth Embodiment

In the third embodiment, in the case where the cycle of flickering can be detected, in the case of flickering that occurs at the frequency of general power supply for business use, and the like, the occurrence of flickering can be suppressed. However, the occurrence of flickering cannot be suppressed in the case of flickering that occurs at a cycle that is not general, in the case where the amount of change in exposure caused by changing the electronic shutter speed cannot be compensated for using the diaphragm or the ND filter, or the like. Accordingly, in this embodiment, an example is described in which correct photometric values are obtained and D range assist is enabled even in a state where flickering is occurring.

Figure 11:
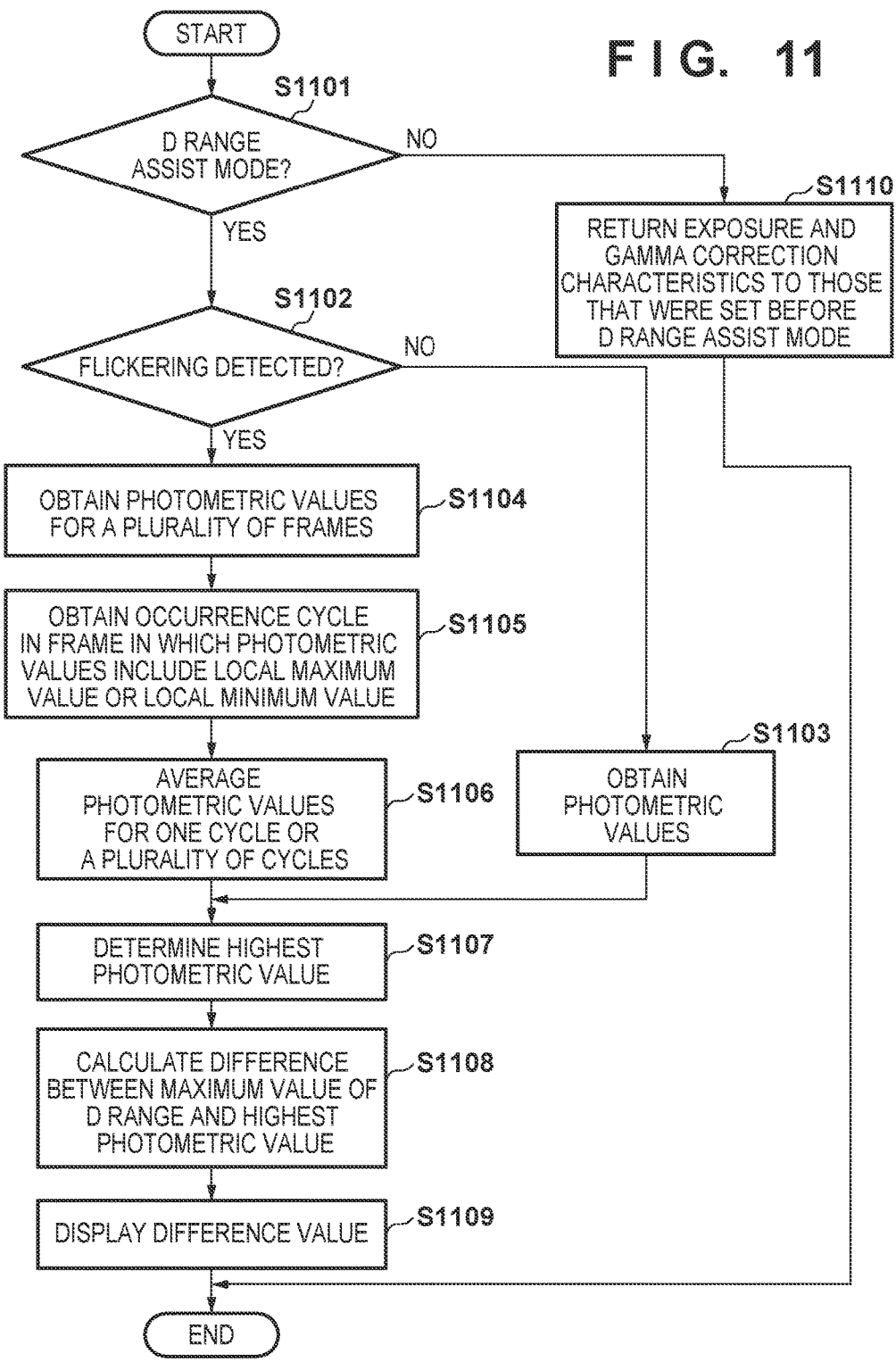
FIG. 11 is a flowchart showing operations of exposure and gamma correction characteristics determination processing in a fourth embodiment.

The appearance and configuration of the image capturing apparatus is the same as the configuration in FIGS. 1 and 2 described in the first embodiment, and thus the description thereof is omitted. FIG. 11 is a flowchart showing the operations of exposure and gamma correction characteristics determination processing in this embodiment.

First, in step S1101, it is determined whether or not D range assist is enabled. Enabling and disabling of D range assist is set by the user using the operation unit 70. If D range assist is disabled, the states of the exposure and gamma correction characteristics are returned to the states before enabling D range assist in step S1110, and the processing is ended. If D range assist is enabled, flicker detection is performed in step S1102. Note that it is preferable to suppress the occurrence of flickering by changing the electronic shutter speed by performing the processing in FIG. 10 in the third embodiment, before the procedure is advanced to step S1102. However, the procedure may be advanced to step S1102 without performing the processing in FIG. 10 in the third embodiment.

In the case where flickering is not detected in step S1102, photometric values are obtained similarly to the process of step S502 in the first embodiment, in step S1103. On the other hand, in the case where flickering was detected in step S1102, the photometric values for a plurality of frames are obtained in step S1104 and are stored.

Next, in step S1105, among the stored photometric values for the frames, two or more frames in which the photometric values include a local maximum value or a local minimal value are detected, and the flicker occurrence cycle in the detected frames is obtained. In step S1106, based on this cycle, stored photometric values for one cycle or a plurality of cycles are averaged. Accordingly, even in a state where flickering is occurring, correct photometric values can be obtained. Here, the greater the number of photometric values that are averaged is, the more reliable the photometric values that are obtained is, but at the same time the calculation will require a longer time.

After that, the highest photometric value is determined in step S1107, the difference between the maximum value of the current D range and the highest photometric value is calculated in step S1108, and the difference value is displayed in step S1109. These processes are the same as the processes of step S503 to step S505 in the first embodiment, and thus detailed description thereof is omitted.

As described above, according to the above-described third and fourth embodiments, the D range is expanded, and at the same time, the characteristics of the output for the incident light become substantially the same as before expanding the D range, thus making it possible to obtain photometric values that were saturated before expanding the D range without causing a video image that is displayed to be unnatural. Therefore, the difference between the maximum value of the D range and the photometric value can be calculated using the photometric value and the current D range.

In addition, in the case of expanding the dynamic range, if the time required for changing the exposure is long, the operability of the camera is adversely affected. In this embodiment, the exposure is changed using the change in the electronic shutter speed that is performed at a faster response speed, and thus it is possible to prevent the operability of the camera from deteriorating. At this time, even if flickering occurs due to the change of the electronic shutter speed, the flickering can be suppressed, or even if flickering occurs, accurate photometric values can be obtained. Therefore, D range assist can be accurately performed.

Fifth Embodiment

In the first to fourth embodiments, an example was described in which in order to quickly perform D range expansion, the one with the fastest response speed out of changing the aperture value, inserting/removing the ND filter, and changing the electronic shutter speed in the image capturing unit is given priority and is used when changing the exposure. However, even if D range expansion can be quickly performed, it may be impossible to shoot a desired video image due to change in the image quality that is obtained when changing the D range.

For example, in the case of changing the exposure by changing the aperture, the depth of field of video that can be shot changes. Usually, if the aperture is narrowed, the depth of field is deepened. This means that the region that appears to be in focus is widened, and that it appears that the entire screen is in focus. Conversely, when the aperture is opened, the depth of field becomes shallower, and the focus range becomes narrower. In that case, regions out of the focus range appear in a blurred manner. Depending on the shooting style, a technique may be used in which the target object is outlined against the blurred regions by using this blur skillfully, and among methods for changing the exposure, the aperture value is often determined first.

As described above, depending on the shooting environment or the shooting style, rather than whether or not the D range assist mode and the normal shooting mode can be quickly changed, change in the image that is desired to be shot may be a problem. In this embodiment, an example will be described in which the method for changing the exposure can be selected in accordance with the intention of the user in the case of expanding the D range using D range assist.

The appearance and configuration of the image capturing apparatus are substantially the same as the configuration in FIGS. 1 and 2 described in the first embodiment, and thus only different portions will be described.

In FIG. 2, the system control unit 50 controls the movement of the diaphragm 101, which has a movement sensor (not illustrated) for detecting how much the opening diameter of the diaphragm 101 changed, and the system control unit 50 can detect the movement of the diaphragm 101 using this movement sensor. Also, a plurality of ND filters 104 are often provided in order to cover the entirety of the opening diameter of the diaphragm 101, the image capturing apparatus has a position sensor for detecting the position of the ND filter 104, and the system control unit 50 can detect the position of the ND filter 104 using this position sensor. Note that the electronic shutter speed that is related to the image capturing unit 22 is controlled by the system control unit 50, but there is no way to find out the current shutter speed, and the electronic shutter speed is controlled considering the difference between a timing that is set and a timing when the video that was exposed with that setting appears.

Figure 12:
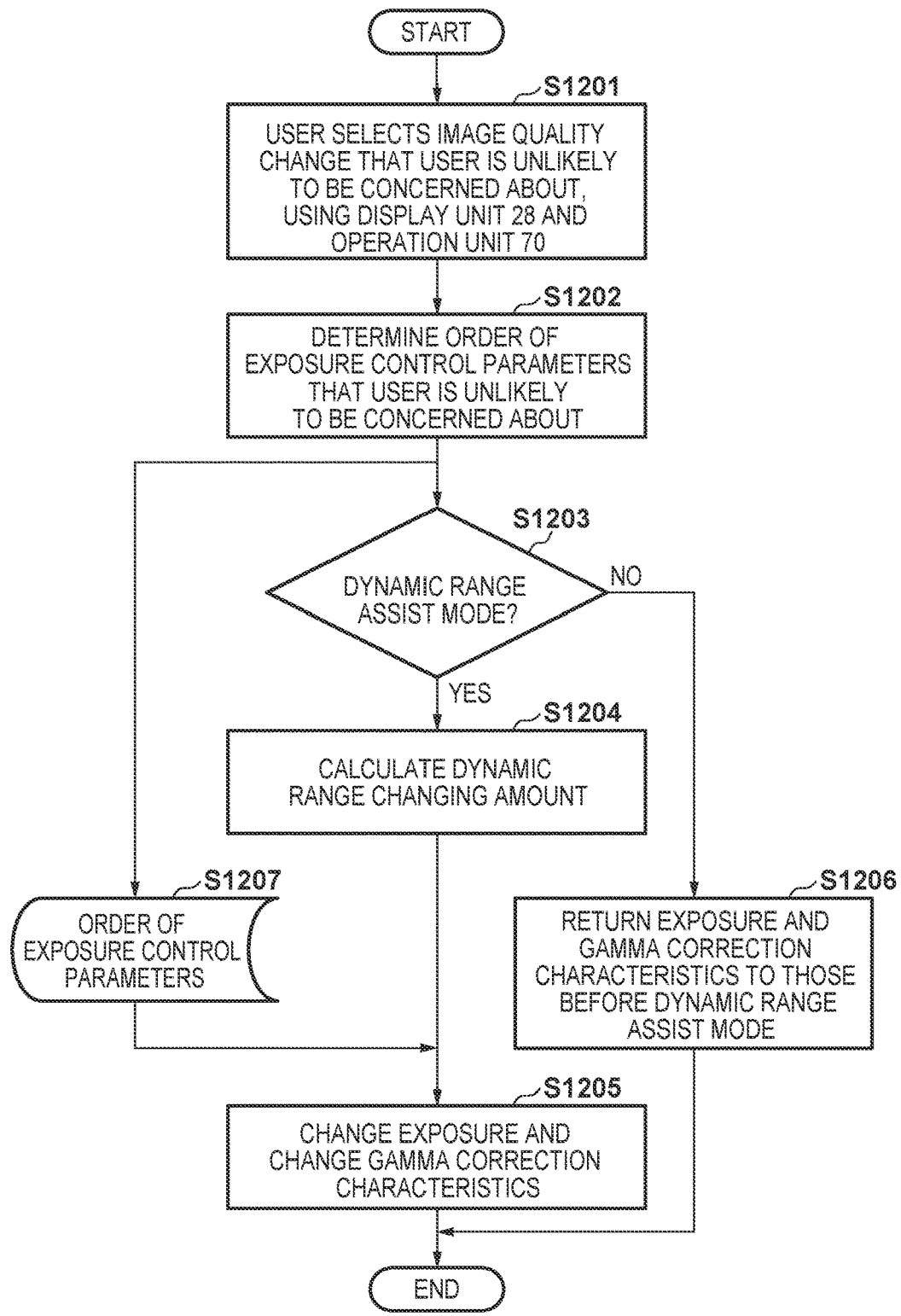
FIG. 12 is a flowchart showing operations of exposure and gamma correction characteristics determination processing in a fifth embodiment.

Next, the operations of the image capturing apparatus of this embodiment will be described. FIG. 12 is a flowchart showing the operations of exposure and gamma correction characteristics determination processing in this embodiment.

First, before determining whether or not D range assist is enabled or disabled, in step S1201, the user is prompted to select image quality change that the user is unlikely to be concerned about from options. At this time, the options are displayed on the display unit 28, such that the user makes a selection using the operation unit 70. For example, the options are as follows.

(1) Switching speed priority
(2) Aperture value priority
(3) Shutter speed priority Among the above options, "Switching speed priority" is a mode for giving priority to early completion of switching from the normal shooting mode to the D range assist mode. "Aperture value priority" is a mode for changing the exposure using parameters other than the aperture value designated by the user, and not changing this aperture value if at all possible. "Shutter speed priority" is a mode for changing the exposure using parameters other than the shutter speed designated by the user, and not changing this shutter speed if at all possible.

When the user selects an option, the order of exposure control that the user is least likely to be concerned about is determined in step S1202. In the case where the user selects "Switching speed priority", the system control unit 50 stores a parameter order as the exposure parameter order 1207 such that values are changed in the order of shortest response time, namely in the order of the electronic shutter speed, the aperture value and the insertion/removal of the ND filter. Operations in this case are the same as those in the first embodiment. In the case where the user selects "Aperture value priority", the system control unit 50 stores a parameter order such that values are changed in the order of the insertion/removal of the ND filter, the electronic shutter speed, and the aperture value. In the case where the user selects "Shutter speed priority", system control unit 50 stores a parameter order such that values are changed in the order of the insertion/removal of the ND filter, the aperture value, and the electronic shutter speed.

When the above-described storing by the system control unit 50 ends, it is determined in step S1203 whether or not D range assist is enabled. Enabling and disabling of D range assist is set by the user using the operation unit 70. If D range assist is disabled, the states of the exposure and gamma correction characteristics are returned in step S1206 to the states before enabling D range assist, and the processing is ended. If D range assist is enabled, the amount by which the D range is to be changed (hereinafter, referred to as a D range changing amount) is calculated in step S1204. The method for calculating the D range changing amount is the same as that of the first embodiment, and thus the description thereof is omitted.

Next, in step S1205, the exposure is changed based on the calculated D range changing amount. At this time, the parameters are changed in the order of the parameters recorded as the exposure control parameter order 1207, the exposure is changed, and at the same time, the gamma correction characteristics are changed.

Controlling the diaphragm 101 and controlling the ND filter 104 take time, and thus the effect appears after several frames. On the other hand, the gamma correction characteristics are immediately changed in the next frame, and thus a luminance shock is visible in some cases. When the user evaluates the D range, it is difficult to view the image if there is a luminance shock, and a configuration may be adopted in which the video image in the state before starting the control is frozen and is continuously output until the control ends.

By performing the control as described above, in the case of the D range assist mode, it is possible to suppress, to a low level, the possibility of occurrence of image quality change that the user is likely to be concerned about, and thus determination of dynamic range can be efficiently performed.

Sixth Embodiment

In the fifth embodiment, the user cannot find out which exposure parameters among the parameters that are used for changing the exposure were used for actual exposure change. In this embodiment, an example will be described in which among the exposure parameters that are used for changing the exposure, the user can be notified of which exposure parameters in the priority order were used for actual exposure change.

Figure 13B:
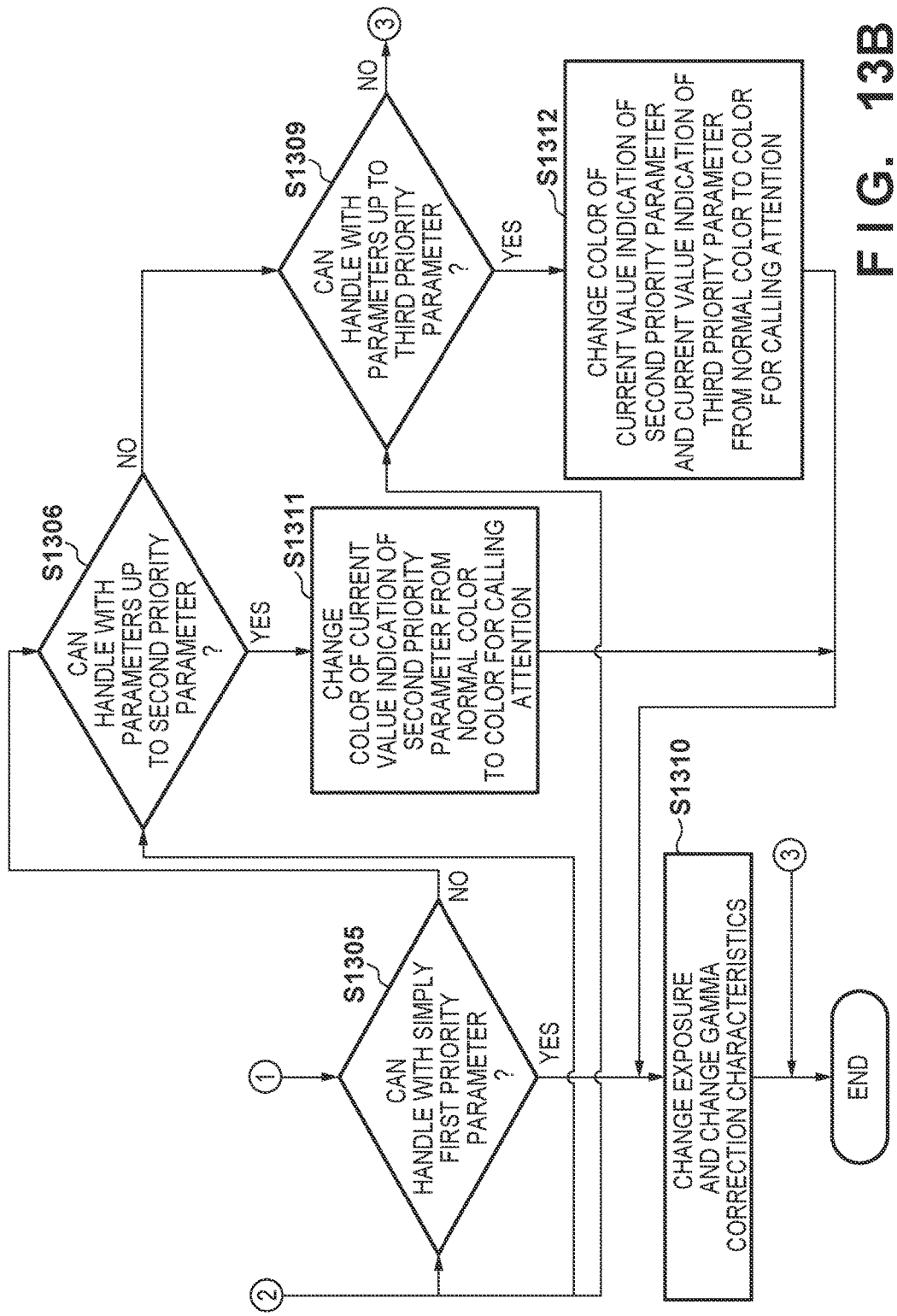

The appearance and configuration of the image capturing apparatus are the same as the configuration described in the fifth embodiment, and thus the description thereof is omitted. FIGS. 13A and 13B are flowcharts showing the operations of exposure and gamma correction characteristics determination processing in this embodiment.

First, before determining enabling and disabling of D range assist, in step S1301, the user is prompted to select, from the options, image quality change that the user is unlikely to be concerned about. At this time, the options are displayed on the display unit 28 so as to prompt the user to make a selection using the operation unit 70. The options are the same as those in the fifth embodiment.

When the user selects an option, the order of exposure control that the user is least likely to be concerned about is determined in step S1302. In the case where the user selects "Switching speed priority", the system control unit 50 stores a parameter order as an exposure parameter order 1307 such that values are changed in the order of shortest response time, namely in the order of the electronic shutter speed, the aperture value, and the insertion/removal of the ND filter. The operations in this case are similar to the first embodiment. In the case where the user selects "Aperture value priority", the system control unit 50 stores a parameter order such that values are changed in the order of the insertion/removal of the ND filter, the electronic shutter speed, and the aperture value. In a case where the user selects "Shutter speed priority", the system control unit 50 stores a parameter order such that values are changed in the order of the insertion/removal of the ND filter, the aperture value, and the electronic shutter speed.

When the above-described storing by the system control unit 50 ends, it is determined in step S1303 whether or not D range assist is enabled. Enabling and disabling of D range assist is set by the user using the operation unit 70. If D range assist is disabled, the states of the exposure and gamma correction characteristics are returned in step S1308 to the states before enabling D range assist, and the processing is ended. If D range assist is enabled, in step S1304, the amount by which the D range is to be changed (hereinafter, referred to as a D range changing amount) is calculated. The method for calculating the D range changing amount is the same as the first embodiment, and thus the description thereof is omitted.

Next, when changing the exposure based on the calculated D range changing amount, it is determined in step S1310 whether or not the parameters in the exposure control parameter order 1307 can handle the exposure changing amount, in the order in which the parameters are recorded.

First, in the case where it is determined in step S1305 that the exposure changing amount can be handled using simply the exposure parameter of the first priority (step S1305: Yes), the exposure is changed similarly to the fifth embodiment and the gamma correction characteristics are changed, in step S1310.

On the other hand, in the case where the exposure changing amount cannot be handled using simply the exposure parameter of the first priority (step S1305: No), and the exposure changing amount can be handled with the parameter of the second priority (step S1306: Yes), the parameter of the second priority is used (a method other than the method of the first priority). In this case, in step S1311, the current value of the parameter of the second priority is displayed in a color for calling attention on the display unit 28. After that, in step S1310, the exposure and gamma correction characteristics are changed as described above. Furthermore, in the case where the exposure changing amount cannot be handled even with the second priority parameter (step S1306: No), and can be handled with the third priority parameter (step S1309: Yes), the exposure is changed by using the first priority parameter, the second priority parameter and the third priority parameter. In this case, in step S1312, the current value of the second priority parameter and the current value of the third priority parameter are displayed in a color for calling attention on the display unit 28. After that, in step S1310, the exposure and gamma correction characteristics are changed as described above. Lastly, in the case where the exposure changing amount cannot be handled even if all the parameters up to the third priority parameter are used (step S1309: No), the control is ended without any operation because D range assist will not function in the first place.

By performing control as described above, it is possible to suppress, to a low level, the possibility of occurrence of image quality change that the user is likely to be concerned about. In addition, even in the case where there is the possibility of occurrence of image quality change, it is possible to call attention using the display unit 28, and thus determination of the dynamic range can be efficiently performed.

Note that in the above description, changing the apparent D range of a displayed image or video by adjusting the exposure and changing the sensitivity was referred to as expansion or reduction of the D range, but there is no limitation to this. For example, a configuration may be adopted in which actually changing the D range of the image sensor or the display image is expanding or reducing the D range in the digital video camera 100.

The present invention was described above in detail based on preferred embodiments thereof, but the present invention is not limited to these specific embodiments, and the present invention includes various modes without departing from the spirit of the invention. The above-described embodiments may be partially combined as appropriate.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-122112, filed Jun. 17, 2015, which is hereby incorporated by reference herein in its entirety.

What is claimed is:

1. An image capturing apparatus comprising:
   an image capturing unit including an image sensor that captures an object image and output image data; and
   at least one processor that performs the operations of the following units by executing instructions stored in at least one memory;
   an adjustment unit configured to adjust an exposure of the image capturing unit;
   a detection unit configured to, in a case where the image data which is based on a signal outputted from the image sensor is saturated, detect a signal level corresponding to a highest level of incident light outputted from the image sensor after the exposure is reduced by the adjustment unit so as to reduce the saturation; and
   a control unit configured to, in a case where the exposure is reduced, preferentially select a method having a faster response speed with respect to an exposure change instruction among a plurality of methods for changing the exposure,
   wherein the control unit adjusts an exposure so as to reduce the saturation based on a dynamic range corresponding to before reducing the exposure and a maximum dynamic range that can be set in the image capturing apparatus.

2. The image capturing apparatus according to claim 1, wherein the methods for changing the exposure include one or more among changing an aperture value, inserting/removing an ND filter, and changing an electronic shutter speed.

3. The image capturing apparatus according to claim 2, wherein the at least one processor further performs the operation of a flicker detection unit configured to detect flickering of illumination light, wherein the control unit changes the electronic shutter speed to an electronic shutter speed at which flickering does not occur, and compensates for change in exposure corresponding to a difference between a target electronic shutter speed and an electronic shutter speed at which the flickering does not occur, using, among the methods for changing the exposure, a method other than the method for changing the electronic shutter speed.

4. The image capturing apparatus according to claim 1, wherein the at least one processor further performs the operation of:
a tone correction unit configured to perform tone correction on the image data; and
a display control unit configured to display a display image obtained by the tone correction unit performing tone correction on the image data,
wherein the control unit changes a characteristic of the tone correction so as to suppress change in the display image caused by the adjustment unit changing the exposure.

5. The image capturing apparatus according to claim 4, wherein the control unit changes the characteristic of the tone correction such that a portion of the display image after reducing the exposure that is substantially the same as in the display image before reducing the exposure becomes saturated.

6. The image capturing apparatus according to claim 1, wherein the detection unit divides a screen of the image data into a plurality of regions, and detects a highest value among signals of the plurality of regions.

7. The image capturing apparatus according to claim 6, wherein the at least one processor further performs the operation of a calculation unit configured to calculate a difference between the highest value detected by the detection unit and a maximum value of a signal that can be expressed within the dynamic range before exposure is reduced by the adjustment unit,
wherein the control unit causes a display control unit to displays the difference.

8. The image capturing apparatus according to claim 7, wherein in a case of using a method other than a first priority method among the methods for changing the exposure, the control unit displays a current value of a parameter related to the method other than the first priority method in a predetermined color for calling attention.

9. The image capturing apparatus according to claim 1, wherein the adjustment unit calculates a dynamic range changing amount so as to reduce the saturation based on the dynamic range corresponding to before reducing the exposure and the maximum dynamic range, and
wherein the adjustment unit adjusts an exposure so as to reduce the saturation based on the dynamic range changing amount.

10. A method for controlling an image capturing apparatus including an image capturing unit including an image sensor that captures an object image and captures image data, the method comprising:
adjusting an exposure of the image capturing unit;
detecting, in a case where the image data which is based on a signal outputted from the image sensor is saturated, a signal level corresponding to a highest level of incident light outputted from the image sensor after reducing the exposure of the image capturing unit by the adjusting so as to reduce the saturation; and
controlling, in a case where the exposure is reduced, to preferentially select a method having a faster response speed with respect to an instruction to change the exposure among a plurality of methods for changing the exposure,
wherein in the controlling, an exposure is adjusted so as to reduce the saturation based on a dynamic range corresponding to before reducing the exposure and a maximum dynamic range that can be set in the image capturing apparatus.

11. A non-transitory computer-readable storage medium that stores a program for causing a computer to execute steps of a method for controlling an image capturing apparatus, the method comprising:
adjusting an exposure of the image capturing unit;
detecting, in a case where the image data which is based on a signal outputted from an image sensor is saturated, a signal level corresponding to a highest level of incident light outputted from the image sensor after reducing the exposure of the image capturing unit by the adjusting so as to reduce the saturation; and
controlling, in a case where the exposure is reduced, to preferentially select a method having a faster response speed with respect to an instruction to change the exposure among a plurality of methods for changing the exposure, wherein in the controlling, an exposure is adjusted so as to reduce the saturation based on a dynamic range corresponding to before reducing the exposure and a maximum dynamic range that can be set in the image capturing apparatus.

* * * * *